US 8,478,041 B2

(12) United States Patent
Pankratius

(10) Patent No.: US 8,478,041 B2
(45) Date of Patent: Jul. 2, 2013

(54) METHOD FOR ANALYZING AND/OR TESTING AT LEAST ONE USER INTERFACE, DATA PROCESSING DEVICE AND COMPUTER PROGRAM PRODUCT

(75) Inventor: Victor Pankratius, Ludwigshafen (DE)

(73) Assignee: Karlsruher Institut für Technologie (DE)

( * ) Notice: Subject to any disclaimer, the term of this patent is extended or adjusted under 35 U.S.C. 154(b) by 1037 days.

(21) Appl. No.: 12/322,515

(22) Filed: Feb. 3, 2009

(65) Prior Publication Data
US 2009/0196497 A1 Aug. 6, 2009

Related U.S. Application Data

(63) Continuation of application No. PCT/EP2007/006901, filed on Aug. 3, 2007.

(30) Foreign Application Priority Data

Aug. 3, 2006 (DE) .......................... 10 2006 036 304

(51) Int. Cl.
*G06K 9/00* (2006.01)
*G06F 17/00* (2006.01)
(52) U.S. Cl.
USPC ........... 382/168; 382/165; 382/169; 382/151; 717/131; 717/127; 717/126; 717/124
(58) Field of Classification Search
USPC ................ 382/165, 169, 151, 168; 715/513, 715/903, 234, 200, 738, 760, 764, 765, 76, 715/736, 205, 60, 749; 717/124–135, 111, 717/115; 707/E17.116, 102, E17.108, 1, 707/E17.058; 709/204, 205, 218, 227; 702/186
See application file for complete search history.

(56) References Cited

U.S. PATENT DOCUMENTS 6,286,001 B1 9/2001 Walker et al.
6,907,546 B1 * 6/2005 Haswell et al. ............ 714/38.11
(Continued)

FOREIGN PATENT DOCUMENTS

JP 2005-190443 A 7/2005

OTHER PUBLICATIONS

Masterne wmedia.org, "Testing your web page across different web browsers", http://www.masternewmedia.org/2001/06/29/testing_your_web_page_across.htm, pp. 1-11.*

(Continued)

*Primary Examiner* — Mekonen Bekele
(74) *Attorney, Agent, or Firm* — Schwegman Lundberg & Woessner, P.A.

(57) ABSTRACT

In summary, the present invention relates to a method for analyzing and/or testing at least one user interface, comprising the steps of:
 transmitting an address of at least one user interface, in particular a web-based user interface, and/or a source code together with the associated graphical elements of at least one user interface, in particular a web-based user interface, to an evaluation apparatus (10);
 transmitting the address of the at least one user interface and/or the source code together with the associated graphical elements of the at least one user interface to at least two differently configured presentation apparatuses (12, 14);
 generating at least one pixel image of the user interface on each presentation apparatus (12, 14);
 transmitting each generated pixel image to the evaluation apparatus (10);
 automatically determining and/or representing at least one difference between the generated pixel images of the at least one user interface.

29 Claims, 11 Drawing Sheets

U.S. PATENT DOCUMENTS

| | | | |
|---|---|---|---|
| 6,918,066 B2* | 7/2005 | Dutta et al. | 714/46 |
| 7,395,498 B2* | 7/2008 | Katayama et al. | 715/234 |
| 7,551,780 B2* | 6/2009 | Nudd et al. | 382/190 |
| 7,757,175 B2* | 7/2010 | Miller | 715/738 |
| 2002/0095415 A1* | 7/2002 | Walker et al. | 707/9 |
| 2003/0061283 A1 | 3/2003 | Dutta et al. | |
| 2009/0172519 A1* | 7/2009 | Xu et al. | 715/234 |
| 2009/0249216 A1* | 10/2009 | Charka et al. | 715/744 |
| 2009/0292677 A1* | 11/2009 | Kim | 707/3 |
| 2010/0017170 A1* | 1/2010 | Kolenc et al. | 703/1 |
| 2010/0088677 A1* | 4/2010 | Li et al. | 717/124 |
| 2010/0146488 A1* | 6/2010 | Chen et al. | 717/128 |
| 2011/0078663 A1* | 3/2011 | Huang et al. | 717/126 |
| 2012/0051634 A1* | 3/2012 | Chong et al. | 382/165 |

OTHER PUBLICATIONS

"German Application Serial No. 200610036304, Office Action mailed Jun. 19, 2007", 3 pgs.

"International Application Serial No. PCT/EP2007/006901, International Search Report mailed Nov. 30, 2007", (w/ English Translation), 5 pgs.

"International Application Serial No. PCT/EP2007/006901, Written Opinion mailed Nov. 30, 2007", 7 pgs.

* cited by examiner

US 8,478,041 B2

METHOD FOR ANALYZING AND/OR TESTING AT LEAST ONE USER INTERFACE, DATA PROCESSING DEVICE AND COMPUTER PROGRAM PRODUCT

RELATED APPLICATIONS

This application is a continuation under 35 U.S.C. 111(a) and claims the benefit of priority to International Patent Application Serial No. PCT/EP2007/006901, filed Aug. 3, 2007, and published as WO 2008/015020 A1, on Feb. 7, 2008, which claims priority under 35 U.S.C. §119 to German Application No. 102006036304.3, filed Aug. 3, 2006, which applications and publication are incorporated herein by reference and made a part hereof in their entirety.

FIELD

Embodiments of the present invention relate to a method for analyzing and/or testing at least one user interface, a data processing device and a computer program product.

BACKGROUND

Regularly, HTML web sites created for the Internet are represented differently by different web browsers. This applies particularly also when the underlying HTML code is completely correct. Despite complying with standards stipulated by the W3C, web browsers have freedom of representation and optionally also different technical characteristics. Therefore, web designers must be able to find out as quickly as possible how their sites are displayed by different web browsers and viewed by different users correspondingly. Manual testing requires great effort, since many browsers must be installed on different operating systems and a specific web site would have to be accessed individually. In addition, different possible screen resolutions and web browser versions may play a role.

In order to obtain a representation of web sites that is as uniform as possible, conventionally, an analysis of the HTML source code of a web site is performed. For doing so, different tools for performing a syntax check are available via the Internet, for example. Here, it is to be noted, however, that a mere syntax check of the HTML code is usually not sufficient to make sure that a thereby described or defined web site is correctly represented in all common web browsers. In particular, the currently available W3C standards allow freedom of representation of HTML, which may possibly be the case also in the foreseeable future. Moreover, web browsers often exhibit internal errors that may lead to an incorrect-representation of web sites. Some manufacturers also decide to add own extensions in their own HTML creation tools and in their own web browsers, which extensions do not conform with the standard. Thus, a check of a web site by accessing it in several concrete web browsers is indispensable also in the case of a syntax check of the HTML code.

BRIEF DESCRIPTION OF THE DRAWINGS

Example embodiments of the present invention are described by means of accompanying figures, wherein individual features of the described embodiments may be freely combined to further embodiments. The figures show

DETAILED DESCRIPTION OF SOME EMBODIMENTS OF THE INVENTION

Figure 1:
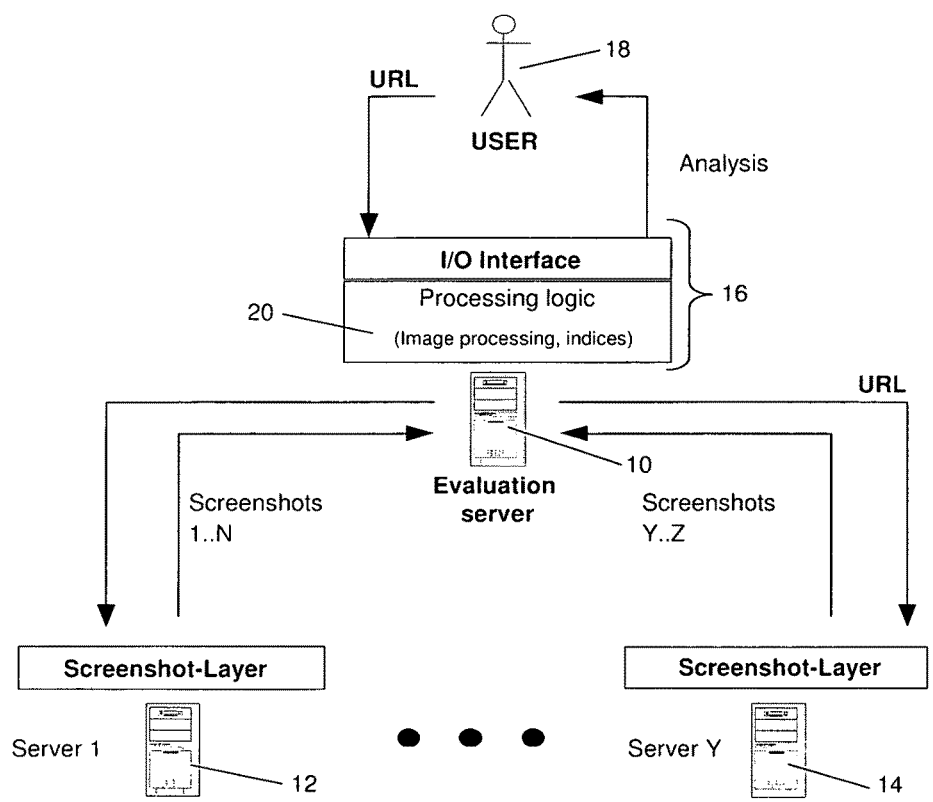
FIG. 1: A schematic view of a data processing device according to some embodiments.

Method According to Some Embodiments an Aspect of the Invention

An aspect of the present invention relates to a method for analyzing and/or testing at least one user interface, in particular a web-based user interface, comprising:
transmitting an address of at least one user interface, in particular a web-based user interface, and/or a source code together with the associated graphical elements of at least one user interface, in particular a web-based user interface, to an evaluation apparatus;
transmitting the address of the at least one user interface and/or the source code together with the associated graphical elements of the at least one user interface to at least two differently configured presentation apparatuses;
generating at least one pixel image of the user interface on each presentation apparatus;
transmitting each generated pixel image to the evaluation apparatus;
automatically determining and/or representing at least one difference between the generated pixel images of the at least one user interface.

Consequently, it is advantageously possible to check (n an automated manner in some embodiments) for a given user interface, in particular a given web site, how it is represented in the different web browsers and/or on different operating systems and/or with different screen resolutions. Here, the user interface may be a conventional user interface of a conventional program, in particular an input mask of an application software. The user interface may also be an interface in its simplest form, in particular with/without graphical element(s) and/or text element(s), as it is e.g. usually displayed during the start-up phase of a computer program. Alternatively/In addition, the user interface may also be web-based, in particular a web site. The user interface may be a user interface created by, or like, a browser.

Furthermore, the user interface may be a statically generated user interface or a dynamically generated user interface. For example, the user interface may be a web site that is created by a static, i.e. defined HTML code. The user interface may also be a web site that is created by a CGI code, a PHP code, etc., and thus is able to represent a variable content.

In this respect, the following explanations regarding the user interface are not limited to the respectively selected, specific user interface, but analogously apply to all user interfaces. In other words, in one embodiment, the user interface may be illustrated and described as a web-based user interface, however, the explanations analogously also apply to arbitrary ones, in particular to the above-mentioned user interfaces.

The pixel image is created such that the pixel image reproduces the display of the user interface (which may particularly be a web-based user interface) and/or the source code together with the associated graphical elements of the web-based user interface in the way a user would see them. In other words, in some embodiments the pixel image comprises one site exactly as it is represented to a user. In other words, exactly that site is displayed to which the indicated address refers. Preferably, it may also be indicated which of the sites or which representation the pixel image is to include if the source code of the web-based user interface includes a plurality of sites. It is regularly the case that by selecting, i.e. due to links of a web-based user interface, particularly one web site, a further site is opened or represented. In particular, it may be possible that in the HTML source code of a site X there are included links or references to another HTML site Y, Z, however, the HTML source code of the sites Y, Z is not included in site X. For example, in some embodiments it might be possible to specify in detail which site is to be displayed in the pixel image. Alternatively, merely the source code of exactly one site of the web-based user interface may be passed to the evaluation apparatus. Similarly, the exact address of the web-based user interface may be passed, which exactly refers to one site.

The term "differently configured" is used in some embodiments such that different operating systems are installed or run on two differently configured presentation apparatuses and/or different software programs, for example different web browsers, are installed or run on the differently configured presentation apparatuses. Differently configured for example also includes that a presentation apparatus is a PC, a server computer, a client computer, a terminal computer, a workstation, a mobile phone, a PDA, a notebook, etc. The other presentation apparatus may also be a PC, a server computer, a client computer, a terminal computer, a workstation, a mobile phone, a PDA, a notebook, etc.

The terms "web-browser" and "browser" are used synonymously. A web browser, or generally referred to or abbreviated as a browser, is a computer program for displaying machine language, in particular for displaying and viewing web sites whose source code is created particularly in HTML. A machine language may for example be a conventional programming language. Generally, a browser is a special computer program with which in particular text files can be displayed. In addition to HTML source code-based sites, it may also be possible that a browser is capable of displaying sites of a different source code or other/different kinds of documents, in particular with graphical elements. To this end, a browser may for example be configured to access and display consecutive sites, wherein the individual sites may be interlinked.

It may further be possible that a browser is capable of playing different media, music files, video files, etc.

It may further be possible that a browser is suited to store programs and/or files on a computer. For this, it is always necessary to imbed graphical elements into the corresponding web site in order to enable storage, wherein it is not always necessary that these elements are of graphical nature. For example, such an element may be a text link that includes an URL of a particular file.

Moreover, a browser or a web browser may comprise a plurality of further functions. For example, a browser may support one or more protocols, such as FTP, Gopher, etc. Some browsers are also provided with e-mail functions, wherein some other browsers cover these functions by external programs.

Furthermore, in some embodiments, insufficient results, as they are for example obtained by a conventional check of HTML codes, are prevented. Instead, a web designer may, in a simple manner, be provided with the knowledge as to how a web site has to look correctly in specific, different browsers, wherein a great manual effort as is conventionally necessary at the moment is prevented. In particular, web sites can advantageously be checked and represented on several systems at the same time, wherein the evaluation of the check is automated. Consequently, a web designer can obtain evaluation results in a shorter period of time as is conventionally necessary.

According to some embodiments of the invention, an evaluation apparatus may particularly comprise a computer, a computer server, an network computer, a workstation, a client computer, etc.

Similarly, each presentation apparatus may in particular comprise a computer, a computer server, a network computer, a workstation, a client computer, etc., wherein the presentation apparatuses may be different from each other. For example, one presentation apparatus may be a computer server, and the other presentation apparatus may be a workstation.

The term "pixel image" as defined herein is used synonymously with "screenshot".

A screenshot may . . . the storage of a current graphical screen content conventionally performed in data processing into a file, which may be a conventional graphics file, such as a conventional jpg, gif, tiff, png file or also a pdf file, etc. In particular, a screenshot may be a raster graphics that may for example not only be stored in a file but also in a clipboard, or which may directly be output via a peripheral device, such as a computer printer.

In particular, it is possible to store and output an image, or copy, of the complete screen in a file and/or to store or output the momentarily active window as a graphics. According to some embodiments of the invention, it is also possible that also invisible areas of the web-based interface are taken into consideration when creating the pixel image. This may particularly be the case if the web-based interface, i.e. in particular the web site, has a bigger size than can be displayed on a screen and if, correspondingly, one would have to scroll in the screen representation. In other words, according to some embodiments of the invention, scrolling may be performed automatically.

In other words, a pixel image or a screenshot is a graphics file in which a web-based user interface or a web site is imaged as it is represented on a computer monitor for the given web browser, the given operating system and the given screen resolution. The term "image" is also used synonymously with "pixel image".

In particular, a pixel image or a digital image or a screenshot as defined herein is a pixel matrix with the width M and the height N, in principle, and consequently includes M*N pixel. Here, in the RGB color model, which is applied in some embodiments, an individual pixel consists of three numerical values between 0 and 255, which are represented as bytes in the computer. Each component includes for a specific pixel the red, green and blue portion (abbreviated as R, G, B portion) of the color of the respective pixel. For example, a red pixel has the values R: 255, G: 0, B: 0, a yellow pixel R: 255, G: 255, B: 0. The color of a pixel may be understood as a vector. Alternatively to the designation M*N pixel, the term M×N pixel may be used as well.

The above description is not limited to the RGB color model which was particularly described as an example color model. Alternatively, other color models may be used as well, such as the conventional CMY color model, the conventional CMYK color model, the conventional HSB color model, the conventional HLS color model, the conventional YIQ/YUY color model and/or the conventional Lab color model.

As already mentioned, a substantially complete copy, or image, i.e. pixel image, of the web-based user interface is created. In other words, a screenshot of a web site is created, wherein all elements of the web site are included as they are represented to a user with the given operating system, with the use of the given web browser and the given or selected resolution. In particular, the pixel image is not limited to parts or areas of this representation.

Example Embodiments of the Method

In some embodiments, for detecting and/or representing the difference of the pixel images, at least one index is determined for the pixel image, and the at least one index of each pixel image is compared to the at least one index of the further pixel image(s).

In other words, at least one parameter can be automatically generated for each representation of a web-based user interface, wherein the parameter is particularly generated by means of the evaluation apparatus, and these parameters are compared to each other in a simple manner particularly by a machine.

Furthermore, in some embodiments, the method comprises the following acts:
creating each pixel image as a gray level image with M*N pixels, wherein the value of the gray level is between 0 and 255 for each pixel;
creating a gray value histogram $H=(x_0, x_1, \ldots, x_{255})$ for each pixel image, wherein the value of each entry $x_j$ of the gray value histogram indicates how many pixels with the gray value i are present in the respective pixel image;
calculating a relative gray value histogram $h=(y_0, y_1, \ldots y_{255})=H/(M*N)$ for each pixel image;
calculating an entropy $$E = -\sum_{i=0}^{255} y_i * \log_2 y_i$$

for each pixel image;
outputting at least one output variable depending on the entropy of each pixel image.

Instead of depending on the variable $y_i$, the entropy E may also be indicated depending on the variable $p_i$, i.e.

$$E = -\sum_{i=0}^{255} p_i * \log_2 p_i,$$

wherein pi is the probability with which a certain gray value occurs in the relative gray value histogram h.

According to this some embodiments of the invention, the information content of a screenshot, i.e. a pixel image, is measured. Here, the basic idea is that screenshots with a different information content must have deviating representations.

In order to determine the output variable, in some embodiments a screenshot represented in R, G, B colors is at first converted into a gray level image, i.e. into an image containing only gray values. A pixel of this gray value image is a number between 0, i.e. black, and 255, i.e. white. For the gray level image, a histogram H equals $(X_0, X_1, \ldots, X_{255})$ is created, wherein the $i^{th}$ component $x_i$ indicates how many pixels with the gray value $x_i$ are present in the gray level image. The relative gray value histogram $h=(y_0, y_1, \ldots, y_{255})=H/(M*N)$ indicates in the $i^{th}$ component $y_i$ the probability with which a certain gray value occurs in the gray level image.

For a specific screenshot having the resolution M*N pixel, i.e. M pixel are arranged along an edge of the pixel image and N pixel are arranged along an edge of the pixel image perpendicular thereto, it is iterated over the number of all pixels. During iteration over these pixels, the numerical values of the R, G, B components of all pixels are preferably reduced to one single numerical value characterizing specific properties of the screenshot. By comparing the indices for different screenshots, it may be determined whether there exist visual deviations, without having to view the images. If there is for example no deviation, i.e. all web browsers represent the web-based user interface, or site, of the web-based user interface in an identical manner, the indices are identical as well. In particular, the comparison may also be automated, wherein by defining suitable threshold values as acceptance thresholds, the index/indices may be used such that one can automatically determine when a deviation is considered relevant.

Here, in some embodiments, the entropy is a variable as is originally used in thermal dynamics, wherein the entropy may also be used as a measure for the information content. If according to some embodiments of the invention screenshots are differently represented by different web browsers and for example some areas, such as tables, images, buttons, etc., are scaled up or down, the distribution of the gray values of individual pixels in the relative gray value histogram changes in some cases. The calculation of the entropy reduces all numbers of the gray value histogram, or the relative gray value histogram, to one single index, wherein differences in the representation of the web-based user interface or pixel image or screenshot can be identified by means of this index.

Alternatively, according to further embodiments or the invention, a index may be obtained from one a plurality of histograms, for example by forming a mean value, a standard deviation, a variation coefficient, etc. The variation coefficient, which is a coefficient of the standard deviation and the mean value, may for example be used to compare histograms of different screenshots.

Preferably, the indices may be created by means of a Fourier analysis and/or a wavelet analysis.

Furthermore, in some embodiments the method comprises the following steps:
creating each pixel image with M*N pixels, wherein the color value of each of the colors red, green and blue is between 0 and 255 for each pixel;
creating at least one color value histogram $H_j=(x_{j0}, x_{j1}, \ldots, x_{j255})$ for a color of the colors red, green and blue for each pixel image, wherein the value of each entry $x_{ji}$ of the color value histogram $H_j$ indicates how many pixels with the color value i of the corresponding color are present in the respective pixel image;

calculating a relative color value histogram $h_j=(y_{j0}, y_{j1}, \ldots, y_{j255})=H_j/(M*N)$ for each pixel image;
calculating an entropy $$E_j = -\sum_{i=0}^{255} y_{ji} * \log_2 y_{ji}$$

for each pixel image;
    outputting at least one output variable depending on the entropy of each pixel image.

Correspondingly, it has been advantageously noted that the entropy cannot only be determined or calculated by means of gray values, but rather also for colored pixel images, wherein for example the entropy of each color can be calculated. In addition, further mathematical operations may be applied to the entropies of the individual colors.

Moreover, the method is performed for two or three of the colors red, green and blue.

Preferably, the output variable comprises the entropy E of each pixel image.

In other words, the output variable may comprise one or a plurality of parameters, in particular the entropy E.

Furthermore, the output variable is created by means of the entropy E of each pixel image.

Consequently, the output variable may also be a combination of different entropies of different pixel images or a combination of the entropies of different colors of a pixel image, etc.

Furthermore, in some embodiments, the method comprises the following steps:
    creating two pixel images as gray level images with M*N pixels, wherein the value of the gray level is between 0 and 255 for each pixel;
    creating a first gray value histogram $H=(x_0, x_1, \ldots, x_{255})$ for the first pixel image, wherein the value of each entry $x_i$ of the first gray value histogram H indicates how many pixels with the gray value i are present in the first pixel image;
    creating a second gray value histogram $H'=(x'_0, x'_1, \ldots, x'_{255})$ for the second pixel image, wherein the value of each entry $x'_i$ of the second gray value histogram H' indicates how many pixels with the gray value i are present in the second pixel image;
    calculating a difference variable D, wherein:

$$D = |H - H'|$$

$$= \sum_{i=0}^{255} |H[i] - H'[i]|;$$

marking a difference if D is greater than a predetermined threshold value, in particular if D>0.

The difference variable D may also be referred to as L1-distance.

Moreover, in some embodiments the method comprises the following:
    creating two pixel images as gray level images with M*N pixels each, wherein the value of the gray level is between 0 and 255 for each pixel;
    creating a first histogram $H=(x_0, x_1, \ldots, x_{255})$ for the first pixel image, wherein the value of each entry $x_i$ of the histogram H indicates how many pixels with the gray value i are present in the first pixel image;
    creating a second histogram $H'=(x'_0, x'_1, \ldots, x'_{255})$ for the second pixel image, wherein the value of each entry $x'_i$ of the histogram H' indicates how many pixels with the gray value i are present in the second pixel image;
    calculating a difference variable D, wherein:

$$D = |H - H'|$$

$$= \sum_{i=0}^{255} (|H[i] - H'[i]|)^2;$$

marking a difference if D is greater than a predetermined threshold value, in particular if D>0.

In other words, according to the above-mentioned embodiment(s), the difference of the gray value histograms of two pixel images or screenshots is calculated, wherein, if at least one component or one minimum number of components of the resulting vector or the difference variable D is unequal 0, differences between the two images are present. Here, two pixel images or screenshots or images are generated whose pixels are considered in the calculation process, wherein both pixel images have to exhibit the same width M and the same height N. If this is not the case, they are automatically cut to size or reduced, i.e. their pixels are reduced to M×N pixel.

The difference variable D may also be referred to as L2-distance.

Preferably, the method comprises the initial step or the initial steps:
    creating a first and a second pixel image, each having the size of M*N pixel;
    selecting a rectangular selection area of the size M/2*N/2 pixels of a first pixel image, wherein a geometric center of the selection area is identical with a geometric center of the first pixel image;
    selecting a rectangular selection area of the size M/2*N/2 pixel of a second pixel image, wherein a geometric center of the selection area is identical with a geometric center of the second pixel image;
    calculating a color of each pixel of the selection area of the first pixel image;
    calculating a color of each pixel of the selection area of the second pixel image;
    calculating an initial correlation coefficient by means of the colors of all pixels of the selection area of the first pixel image and by means of the colors of all pixels of the selection area of the second pixel image, wherein the selection area is associated with a shifting direction with an index 0;
    the repeatedly performed steps:
        selecting a further rectangular selection area of the size M/2*N/2 pixel of the second pixel image, wherein the geometric center of the further rectangular selection area of the second pixel image is shifted along a predetermined shifting direction with respect to the geometric center of the second pixel image, and the shifting direction is associated with an index;
        calculating a color of each pixel of the further selection area of the second pixel image;
        calculating a further correlation coefficient by means of the colors of all pixels of the selection area of the first pixel image and by means of the colors of all pixels of the further selection area of the second pixel image,
        wherein for each repeatedly performed step, the position of the geometric center of the further rectangular selection area of the second pixel image is different from the respective positions of the geometric center of the previous selection areas of the second pixel image, and the final step:

outputting the index of the shifting direction of the further selection area with the largest correlation coefficient from the set of the initial correlation coefficient and all further correlation coefficients.

Here, in some embodiments, the correlation coefficient may be a conventional correlation coefficient as is known in statistics.

In other words, two pixel images, i.e. screenshots created by the different browsers, are compared, wherein it is particularly checked whether the screenshots created by the different browsers are "shifted" or scaled against each other in a specific direction. This may be performed by means of the so-called "displacement vector", wherein the displacement vector as a number between 1 and 8 indicates how the presumed direction of shift is, e.g. the numbers (clockwise) mean: 1: upward, 2: to the top right, 3: to the right, ..., 8: to the top left.

The value of the displacement vector, i.e. a number between 1 and 8, may be output as the index.

In other words, two pixel images are generated, each pixel image having a size of M×N pixels. Subsequently, an imaginary or virtual window may be defined, which has the height N/2 and the width M/2 (in pixels). This window is placed in the middle of the first screenshot. Likewise, a corresponding window is placed in the center of the second screenshot. Stated differently, a central or intermediate area of the first screenshot may be selected, wherein in some embodiments this area is rectangular and has a height of N/2 and a width of M/2 pixels. The center of the selected area or the imaginary window corresponds substantially to the center of the screenshot, wherein center may be used synonymously with geometric center.

Furthermore, the color of a pixel is interpreted as a number that uniquely identifies a specific color and is obtained from the R, G, values. To this end, a specified algorithm may be used. Subsequently, it is iterated over all pixels in the imaginary window, i.e. over all pixels in the selection area, and the correlation coefficient between the colors in the first and second screenshots is determined, i.e. the correlation coefficient relating to the colors of the pixels of the imaginary window of the first screenshot and relating to the colors of the corresponding pixels, i.e. the pixels of the imaginary window of the second screenshot arranged at the corresponding position, is determined. The result may temporarily be stored. Subsequently, the imaginary window in the second screenshot is shifted in all eight possible directions, i.e. upward, to the top right, to the right, ..., to the left, to the top left, wherein the center of the windows is shifted along one or both axes, i.e. substantially parallel to the edges of the pixel image, by M/4 and/or N/4 pixels. Here, the shifting along each of the axes may be in positive or negative directions. The correlation coefficient is determined for each direction.

In other words, when viewing the pixel image in a conventional manner, the lower left corner (as seen by the viewer) of the pixel image may for example be selected as the coordinate origin. Starting from this coordinate origin, the center of the virtual pixel image is selected, wherein this center has the coordinates (M/2, N/2). The first coordinate, i.e. the x coordinate, in this example determines all pixels lying M/2 pixels to the right (as seen by the viewer) of the coordinate origin. The second coordinate, i.e. the y coordinate, determines all pixels being N/2 pixels above (as seen by the viewer) the coordinate origin. Starting from the center of the pixel image, the center of the selection area may be shifted, wherein the shifting direction may be a direction substantially parallel to a diagonal of the pixel image (i.e. to the top right, to the bottom left, to the bottom right, or to the top left) or parallel to one of the edges of the image, i.e. parallel to one of the axes of the coordinate system (i.e. upward, downward, to the right, or to the left).

Consequently, the coordinate system is a Cartesian coordinate system in which the coordinate origin is a corner of the pixel image, in particular the upper left corner (as seen by a viewer) of the pixel image. The axes of the coordinate system coincide with the edges of the pixel image, which meet in the lower left corner.

From all calculated or determined correlation coefficients, the largest correlation coefficient is determined, and the value of the displacement vector is output for the corresponding direction. In other words, the index 0 is for example output if the imaginary window of the first and second screenshots, which was originally arranged in the center, has the largest correlation coefficient. An index 1 is for example output if the imaginary window of the first screenshot, which was arranged in the center, and the imaginary window of the second screenshot, which was shifted upward by N/4 pixels (and neither to the right nor to the left), have the largest correlation coefficient. The index 3 is for example output if the imaginary window of the first screenshot and the imaginary window of the second screenshot, which was shifted to the right (and neither upward nor downward) by M/4 pixels, have the largest correlation coefficient.

Further, in some embodiments, a corner of the M*N-pixel-large second pixel image is selected as a coordinate origin and starting from the selected corner of the second pixel image, the edge of the length of M pixels of the second pixel image is a first axis of a coordinate system and starting from the selected corner of the second pixel image, the further edge of the length of N pixels of the second pixel image is a second axis of the coordinate system, wherein the geometric center is distant from the coordinate origin by M/2 pixels along the first axis and distant from the coordinate origin by N/2 pixels along the second axis, and the shifting direction may be one out of eight directions, wherein the geometric center of the further selection area, starting from the geometric center of the pixel image, is shifted by 0 pixels along the direction of the first axis and by N/4 pixels along the direction of the second axis, and this direction is associated with the index 1;

is shifted by M/4 pixels along the direction of the first axis and by N/4 pixels along the direction of the second axis, and this direction is associated with the index 2;

is shifted by M/4 pixels along the direction of the first axis and by 0 pixels along the direction of the second axis, and this direction is associated with the index 3;

is shifted by M/4 pixels along the direction of the first axis and by N/4 pixels in the opposite direction of the second axis, and this direction is associated with the index 4;

is shifted by 0 pixels along the direction of the first axis and by N/4 pixels in the opposite direction of the second axis, and this direction is associated with the index 5;

is shifted by M/4 pixels in the opposite direction of the first axis and by N/4 pixels in the opposite direction of the second axis, and this direction is associated with the index 6;

is shifted by M/4 pixels in the opposite direction of the first axis and by 0 pixels along the direction of the second axis, and this direction is associated with the index 7;

is shifted by M/4 pixels in the opposite direction of the first axis and by N/4 pixels along the direction of the second axis, and this direction is associated with the index 8;

The above explanations, in particular with respect to the choice of the coordinate system of a pixel image and with respect to the definition of the shifting direction, etc., analogously apply to the choice and/or position of a coordinate system of the respective pixel image as well as to the choice and/or position of the selection areas as well as the shifting of at least one of the selection areas.

Furthermore, in some embodiments, each pixel image is colored according to a predetermined color by the presentation apparatus and/or the evaluation apparatus, wherein the predetermined color is different for all pixel images, and an output pixel image is output by the evaluation apparatus for automatically determining and/or representing the difference of the pixel images of the at least one web-based user interface, which output pixel image is created by applying a predetermined operation, in particular pixelwise difference, to the individual pixel images.

In other words, each pixel image may for example be represented in off-colors, wherein for example one pixel image may be colored green, one pixel image may be colored red, one pixel image may be colored blue, etc. If the pixel images are superimposed, wherein for example one or a plurality of the pixel images may at least partially be represented in transparent manner, representation differences can be visually identified by the web designer in a simple manner. Advantageously, the superposition of screenshots according to a some embodiments of the invention thus allows web designers to quickly grasp the representation differences that are of interest to them.

In order to generate the difference of two or more images, different operators may be used. On the assumption that two images have an equal height and width, in principle, an iteration is performed over the entire pixels of the first image, and the color values of a pixel of the first image are offset against the corresponding pixel of the second image by means of a predefined operator, wherein this is done for all pixels of the two images. The result is a new image that is represented.

For automatically determining and/or representing the difference of the N pixel images of the at least one web-based user interface, in some embodiments an output pixel image is output by the evaluation apparatus,
  wherein the output pixel image is created from N individual pixel images such that for each pixel image, the color value of each pixel of this pixel image is varied according to a predetermined color value variation function, wherein the color value variation function is different for all pixel images, and
  wherein, according to their position, corresponding pixels of the pixel images are offset against each other by means of a given operation, in particular pixelwise difference, as the corresponding pixel of the output pixel image.

Furthermore, in some embodiments the operation comprises a vector difference, XOR of the R, G, B values, a mean value formation, etc.

Advantageously, it is not necessary that a user, for example a web designer, installs a plurality of operating systems, browser types, browser versions with different screen resolutions in order to obtain the respective screenshots.

Further advantageously, many details, e.g. text, images, tables, etc., of a web site may be included in the screenshots, wherein by a simple difference of two screenshots and/or a superposition with at least partial transparency, the differences between the two screenshots would possibly not be visible. According to some embodiments of the invention, it has been noted that by coloring the individual screenshots similar to an off-color representation before the difference formation, differences after the difference formation can be represented better and can be better recognized by the user or viewer as being conventional.

For example, the coloring is done via a look-up table including, for a specific color value, an associated color value for the colored image. The color values of the look-up table may also be created by predefined functions, which e.g. image the R, G, B color space such that the colors of the colored image appear bluish, reddish, greenish, yellowish, etc. Moreover, a legend may be added to the resulting image, which identifies the representation by a specific browser, e.g. by associating the off-color with the respective browser.

In other words, the color value variation function may exhibit both a link with a look-up table and/or comprise a direct operation on one or more color values of a pixel, wherein this applies to all pixels.

For superimposing the screenshots, one screenshot may be for example non-transparent and a second screenshot may have a transparency different from 0, wherein for example 2, 3, 4, 5, etc., pixel images may be superimposed which are in particular colored differently, and the pixel images may be represented at least partially in transparent manner one after the other.

Moreover, in some embodiments, during transmission of the address of the at least one web-based user interface and/or during transmission of the source code of the at least one web-based user interface to the evaluation apparatus, at least one operating system and/or at least one web browser is specified or indicated, for which the pixel images of the at least one web-based user interface are created.

In other words, the web-based user interface may be passed from the evaluation apparatus to a presentation apparatus on which a specific operating system is executed. On this presentation apparatus, for example a conventional computer, 1, 2, 3, etc. web browsers may be installed, wherein a partial quantity or all of these web browsers are used for creating a screenshot.

For example, different operating systems, such as Linux, Windows, MacOS, etc., may be determined as well.

In some embodiments, the address of the at least one web-based user interface and/or the source code are transmitted to the respective presentation apparatus together with the associated graphical elements of the at least one web-based user interface, said presentation apparatus having the corresponding operating system and/or the corresponding web browser.

If it is for example specified that one screenshot is to be represented under the operating system Windows with representation by the web browser "Internet Explorer" and a further screenshot is to be generated under the operating system "Linux" with representation by the web browser "Opera", the address and/or the source code are passed to corresponding presentation apparatuses, i.e. corresponding computers for clients or servers, etc., particularly together with the associated graphical elements of the web-based user interface.

The term "exhibit" is used synonymously with "installed". In other words, an operating system runs on the presentation apparatus that comprises the operating system.

Furthermore, in some embodiments, during transmission of the address of the at least one web-based user interface and/or during transmission of the source code together with the associated graphical elements of the at least one web-based user interface to the evaluation apparatus, resolutions are indicated with which the pixel images of the at least one web-based user interface are to be created, wherein the resolutions are transmitted to the respective presentation apparatus(es).

Resolutions may particularly be indicated as the number of pixels per image, wherein the number of the M*N pixels of the image is for example indicated as the resolution. This may be for example a resolution of 1240×1024 pixels, 640×480 pixels, etc. In particular, the resolutions may be equal or different.

Data Processing Device According to an Aspect of Some Embodiments of the Invention A further aspect of some embodiments of the present invention relates to a data processing device, in particular a computer system, for analyzing and/or testing at least one web-based user interface, comprising:
- an input device adapted for inputting and transmitting an address of at least one web-based user interface and/or the source code together with the associated graphical elements of at least one web-based user interface to an evaluation apparatus;
- an evaluation apparatus adapted for transmitting the address of the at least one web-based user interface and/or the source code together with the associated graphical elements of the at least one web-based user interface to at least to differently configured presentation apparatuses;
- at least two differently configured presentation apparatuses, each being adapted to generate at least one pixel image of the web-based user interface and each being adapted to transmit each pixel image to the evaluation apparatus, wherein
- the evaluation apparatus is further adapted to automatically determine and/or represent at least one difference between the pixel images of the at least one web-based user interface.

Example Embodiments of the Data Processing Device

Preferably, the evaluation apparatus is adapted to determine at least one index for determining the difference of the pixel images for each pixel image and to compare the at least one index of each pixel image with the at least one index of the further pixel images.

Furthermore, in some embodiments:
- the respective presentation apparatuses are adapted to create each pixel image as a gray level image with M*N pixels, wherein the value of the gray level is between 0 and 255 for each pixel, and/or;
- the evaluation apparatus is adapted to create a gray level image with M*N pixels from each pixel image, wherein the value of the gray level is between 0 and 255 for each pixel, and/or;
- the respective presentation apparatuses are adapted, and/or the evaluation apparatus is adapted to create a gray value histogram $H=(x_0, x_1, \ldots, x_{255})$ for each pixel image, wherein the value of each entry $x_i$ of the gray value histogram indicates how many pixels with the gray value i are present in the respective pixel image;
- the respective presentation apparatuses are adapted, and/or the evaluation apparatus is adapted to calculate a relative gray value histogram $h=(y_0, y_1, \ldots, y_{255})=H/(M*N)$ for each pixel image,
- the evaluation apparatus is adapted to calculate an entropy $$E = -\sum_{i=0}^{255} y_i * \log_2 y_i$$

for each pixel image, and
- the evaluation apparatus is adapted to output at least one output variable depending on the entropy of each pixel image.

Preferably,
- the respective presentation apparatuses are adapted to create each pixel image with M*N pixels, wherein the color value for each of the colors red, green and blue is between 0 and 255 for each pixel;
- the respective presentation apparatuses are adapted, and/or the evaluation apparatus is adapted to create at least one color value histogram $H_j=(x_{j0}, x_{j1}, \ldots, x_{j255})$ for at least one color of the colors red, green and blue for each pixel image, wherein the value of each entry $x_{ji}$ of the color value histogram j indicates how many pixels with the color value i of the corresponding color are present in the respective pixel image;
- the respective presentation apparatuses are adapted, and/or the evaluation apparatus is adapted to calculate a relative color value histogram $h_j=(y_{j0}, y_{j1}, \ldots y_{j255})=H_j/(M*N)$ for each pixel image;
- the evaluation apparatus is adapted to calculate an entropy of at least one color $$E = -\sum_{i=0}^{255} y_{ji} * \log_2 y_{ji}$$

for each pixel image;
- the evaluation apparatus is adapted to output at least one output variable depending on at least the entropy of each pixel image of a color.

In some embodiments, the data processing device is adapted to output the output variable depending on at least the entropy of each pixel image for two or three of the colors red, green and blue.

Furthermore, in some embodiments, the evaluation apparatus is adapted to determine the output variable such that the output variable comprises the entropy of each pixel image for a gray level image and/or for at least one color.

The evaluation apparatus is adapted to determine the output variable such that the output variable is created by means of the entropy E of each pixel image.

According to some embodiments of the data processing device,
- two presentation apparatuses are adapted to each create a pixel image as a gray level image with M*N pixels, wherein the value of the gray level is between 0 and 255 for each pixel image for each pixel;
- the first one of the two presentation apparatuses is designed to create a first gray value histogram $H=(x_0, x_i, \ldots, x_{255})$ for the first pixel image, wherein the value of each entry $x_i$ of the first gray value histogram H indicates how many pixels with the gray value i are present in the first pixel image;
- the second one of the two presentation apparatuses is adapted to create a second gray value histogram $H'=(x'_0, x'_1, \ldots, x'_{255})$ for the second pixel image, wherein the value of each entry $x'_i$ of the second gray value histogram H' indicates how many pixels with the gray value i are present in the second pixel image, and/or the evaluation apparatus is adapted to create a first gray value histogram $H=(x_0, x_1, \ldots, x_{255})$ for the first pixel image, wherein the value of each entry $x_i$ of the first gray value histogram H indicates how many pixels with the gray value i are present in the first pixel image, and to create a second gray value histogram $H'=(x'_0, x'_1, \ldots, x'_{255})$ for the second pixel image, wherein the value of each entry $x'_i$ of the second gray value histogram H' indicates how many pixels with the gray value i are present in the second pixel image, the evaluation apparatus is adapted to calculate a difference variable D, wherein:

$$D = |H - H'|$$
$$= \sum_{i=0}^{255} |H[i] - H'[i]|;$$

and the evaluation apparatus is adapted to mark a difference if D is greater than a predetermined threshold value, in particular if D>0.

According to a some further embodiments of the data processing device, two presentation apparatuses are adapted to each create a pixel image as a gray level image with M*N pixels, wherein the value of the gray level is between 0 and 255 for each pixel image for each pixel;

the first one of the two presentation apparatuses is adapted to create a first gray value histogram $H=(x_0, x_1, \ldots, x_{255})$ for the first pixel image, wherein the value of each entry $x_i$ of the first gray value histogram H indicates how many pixels with the gray value i are present in the first pixel image;

the second one of the two presentation apparatuses is adapted to create a second gray value histogram $H'=(x'_0, x'_1, \ldots, x'_{255})$ for the second pixel image, wherein the value of each entry $x'_i$ of the second gray value histogram H' indicates how many pixels with the gray value i are present in the second pixel image, and/or the evaluation apparatus is adapted to create a first gray value histogram $H=(x_0, x_1 \ldots, x_{255})$ for the first pixel image, wherein the value of each entry $x_i$ of the first gray value histogram H indicates how many pixels with the gray value i are present in the first pixel image, and to create a second gray value histogram $H'=(x'_0, x'_1, \ldots, x'_{255})$ for the second pixel image, wherein the value of each entry $x'_i$ of the second gray value histogram H' indicates how many pixels with the gray value i are present in the second pixel image, the evaluation apparatus is adapted to calculate a difference variable D, wherein:

$$D = |H - H'|$$
$$= \sum_{i=0}^{255} (|H[i] - H'[i]|)^2;$$

and the evaluation apparatus is adapted to mark a difference if D is greater than a predetermined threshold value, in particular if D>0.

According to a some embodiments of the data processing device, the presentation apparatuses are each adapted to create first and second pixel images, each having the size of M*N pixels, wherein the evaluation apparatus is adapted to, in an initial step, select a rectangular selection area of the size M/2*N/2 pixels of the first pixel image, wherein a geometric center of the selection area is identical with a geometric center of the first pixel image;

select a rectangular selection area of the size M/2*N/2 pixels of a second pixel image, wherein a geometric center of the selection area is identical with a geometric center of the second pixel image;

calculate a color of each pixel of the selection area of the first pixel image;

calculate a color of each pixel of the selection area of the second pixel image;

calculate an initial correlation coefficient by means of the colors of all pixels of the selection area of the first pixel image and by means of the colors of all pixels of the selection area of the second pixel image, and to associate the selection area with a shifting direction with an index 0;

the evaluation apparatus is adapted to, in the repeatedly performed steps:

select a further rectangular selection area of the size M/2*N/2 pixels of the second pixel image, wherein the geometric center of the further rectangular selection area of the second pixel image is shifted along a predetermined shifting direction with respect to the geometric center of the second pixel image, and the shifting direction is associated with an index;

calculate a color of each pixel of the further selection area of the second pixel image;

calculate a further correlation coefficient by means of the colors of all pixels of the selection area of the first pixel image and by means of colors of all pixels of the further selection area of the second pixel image, wherein, in each repeatedly performed step, the position of the geometric center of the further rectangular selection area of the second pixel image is different from the respective positions of the geometric center of the previous selection areas of the second pixel image, and wherein the evaluation apparatus is adapted to, in a final step: output the index of the shifting direction of the further selection area with the largest correlation coefficient from the set of the initial correlation coefficients and all further correlation coefficients.

In some embodiments the evaluation apparatus is adapted to select a corner of the M*N-pixel-large second pixel image as a coordinate origin and, starting from the selected corner of the second pixel image, determine the edge of the length M pixels of the second pixel image as a first axis of a coordinate system and, starting from the selected corner of the second pixel image, determine the further edge of the length N pixels of the second pixel image as a second axis of the coordinate system, determine the geometric center distant from the coordinate origin by M/2 pixels along the first axis and distant from the coordinate origin by N/2 pixels along the second axis, and determine the shifting direction as one out of eight directions, wherein the geometric center of the further selection area, starting from the geometric center of the pixel image, is shifted by 0 pixels along the direction of the first axis and by N/4 pixels along the direction of the second axis, and this direction is associated with the index 1;

is shifted by M/4 pixels along the direction of the first axis and by N/4 pixels along the direction of the second axis, and this direction is associated with the index 2;

is shifted by M/4 pixels along the direction of the first axis and by 0 pixels along the direction of the second axis, and this direction is associated with the index 3;

is shifted by M/4 pixels along the direction of the first axis and by N/4 pixels in the opposite direction of the second axis, and this direction is associated with the index 4;

is shifted by 0 pixels along the direction of the first axis and by N/4 pixels in the opposite direction of the second axis, and this direction is associated with the index 5;

is shifted by M/4 pixels in the opposite direction of the first axis and by N/4 pixels in the opposite direction of the second axis, and this direction is associated with the index 6;

is shifted by M/4 pixels in the opposite direction of the first axis and by 0 pixels along the direction of the second axis, and this direction is associated with the index 7;

is shifted by M/4 pixels in the opposite direction of the first axis and by N/4 pixels along the direction of the second axis, and this direction is associated with the index 8.

Preferably, each presentation apparatus and/or the evaluation apparatus is adapted to color each pixel image according to a predetermined color, wherein the predetermined color may be, or is, different for all pixel images, and the evaluation apparatus is adapted to output an output pixel image for automatically determining and/or representing the difference of the pixel images of the at least one web-based user interface, the output pixel image being created by applying a given operation, in particular pixelwise difference, to the individual pixel images.

In some embodiments the evaluation apparatus is adapted to output an output pixel image for automatically determining and/or representing the difference of the N pixel images of the at least one web-based user interface, wherein the evaluation apparatus is adapted to create the output pixel image from N individual pixel images such that for each pixel image the color value of each pixel of this pixel image is varied according to a predetermined color value variation function, wherein the color value variation function is different for all pixel images, and wherein the evaluation apparatus is adapted to, according to their position, offset corresponding pixels of the pixel images by means of a given operation, in particular pixelwise difference, as the corresponding pixel of the output pixel image.

Preferably, the operation comprises vector difference and/or XOR of the R, G, B values and/or mean value formation, etc.

Preferably, the input device is adapted to, during transmission of the address of the at least one web-based user interface and/or during transmission of the source code together with the associated graphical elements of the at least one web-based user interface to the evaluation apparatus, indicate at least one operating system and/or at least one web browser for which the pixel images of the at least one web-based user interface are to be created.

In some embodiments, the input device is adapted to transmit the address of the at least one web-based user interface and/or the source code together with the associated graphical elements of the at least one web-based user interface to the respective presentation apparatus which the corresponding operating system and/or the corresponding web browser comprises.

Furthermore, in some embodiments, the input device is adapted to indicate, during transmission of the address of the at least one web-based user interface and/or during transmission of the source code together with the associated graphical elements of the at least one web-based user interface to the evaluation apparatus, resolutions for which the pixel images of the at least one web-based user interface are to be created, and wherein the evaluation apparatus is adapted to transmit the resolutions to the respective presentation apparatus(es).

Computer Program Product According to Some Embodiments of the Invention

A further embodiment of the present invention relates to a computer program product, in particular a computer-readable medium, which is stored or realized as a signal which, when loaded into a computer and executed by a computer, causes the computer to execute an inventive method.

The above explanations with respect to the embodiments of the invention are not limited to the respective aspects of the invention. Instead, the explanations analogously apply to all embodiments and aspects of the invention.

According to some embodiments of the invention, different kinds of output can be created by means of given addresses of web-based user interfaces, i.e. in particular by means of the URL of a web site as input and/or or corresponding source codes:

A complete pixel image, i.e. a screenshot of the web-based user interface, in particular as a web site, is created for the given URL for each common or for a plurality of common browser versions on one or several common operating systems with one or several common screen resolutions;

an evaluation image may for example be a visual superposition of the generation of the screenshots;

furthermore, one or several indices or metrics may be calculated for each screenshot. For example, by comparison of indices of several screenshots, the appearance of the web-based user interface, in particular the appearance of a web site, may be checked during representation in different browsers in an automated manner. The representations of the different web browsers may for example be compared pair by pair. Like indices of several screenshots may also be aggregated to one total number, which facilitates the assessment of deviations, in particular of visual deviations.

Here, one address, i.e. one URL, always references exactly one artifact, for example a web-site, an image, or other files.

FIG. 1 schematically shows a an embodiment of a data processing device 1 with an evaluation server 10 as the evaluation apparatus, as well as a server 12 and a server 14 as presentation apparatuses. A predefined operating system, such as Linux, Unix, Windows, MacOS, etc., may be installed and run on the server 12. Moreover, the server 12 may comprise one or more web browsers, for example an Internet Explorer in one or various versions, Firefox, Opera, Mozilla, Netscape, etc., wherein the web browsers may also be installed in various versions. Furthermore, the operating systems and/or the web browsers may be adjusted to different resolutions, for example 1024×768, 1240×1024, etc. Analogously, an operating system may run on the server 14, which is different from the operating system of the server 12. However, the operating system of the server may also be identical with the operating system of the server 12. For example, Ubuntu Linux, Red Hat Linux, Debian Linux, Windows XP Professional, Windows XP Home may be installed on the server 14. Furthermore, the program KDE Konqueror, Opera, etc., may be installed on the server 14 as a web browser.

In addition, the data processing device 1 may comprise further additional servers (not shown). On each server 12, 14, an arbitrary number of screenshots, in particular 1 . . . n screenshots on the server 12 and Y . . . Z screenshots on the server 14, may be created, each for example by using different web browsers and/or different resolutions.

The screenshots may be created particularly in that a web address, in particular an URL, is passed to the respective servers 12, 14 by the evaluation server 10. Alternatively, a complete source text may be passed to the servers 12, 14 by the evaluation server 10. For example, a user 18 may pass a web address, in particular an URL, to the evaluation server 10 by means of an input/output interface 16, which may comprise for example a monitor and a keyboard or a mouse, etc. The evaluation server 10 may pass the URL to the servers 12, 14 and/or pass parts of the source text and/or the complete source text to the servers 12, 14, which in turn create the pixel images, i.e. the screenshots, as so-called "screenshot layer" and pass them back to the evaluation server 10 in partially unprocessed manner.

In some embodiments, the evaluation server 10 comprises a processing logic 20 adapted to perform an image processing, in particular to superimpose the screenshots for example pair by pair or all screenshots or part of the screenshots and/or to create indices of individual screenshots or screenshot pairs. These indices may be output to the user 18 via an output apparatus of the input/output interface 16. Furthermore, the representation of the web-based user interface, i.e. one or a plurality of the respective screenshots or pixel images or processed pixel images, in particular superpositions of the pixel images, may be output to the user 18 by means of the monitor of the input/output interface 16.

In other words, the system exemplarily illustrated in FIG. 1, or the data processing device 1 exemplarily illustrated in FIG. 1, allow the user 18 to input the URL of the web site to be tested and possibly further information for the visual test, for example desired operating systems, desired web browsers, desired resolutions, etc., by means of a web interface as part of the input/output interface 16. The evaluation server 10 propagates the data to further servers 12, 16, which create screenshots of the web site in preconfigured environments and pass them back to the evaluation server 10 at least partially. Then, the evaluation server 10 analyses the screenshots and provides the evaluation results to the user 18, wherein the evaluation results are output in particular by means of a computer monitor, for example also via further peripheral devices, in particular a printer, as part of an input/output interface 16.

On the one hand, the processing logic 20 as part of the evaluation server 10 calculates, from the screenshots, new pixel images, for example superposition of several (in particular colored) screenshots, pixelwise difference, etc. On the other hand, the processing logic 20 may also be al logic device 20 separate from the evaluation server 10. For example, the evaluation server 10 may be a computer server, which for connection is connected with a further computer that comprises the processing logic 20.

Moreover, the processing logic 20 can calculate indices for all screenshots. For example, in doing so, the relative R, G, B histograms of screenshots may be compared with each other in order to detect different color representations in different colors, or different colors. The above explanations are not limited to the R, G, B color model, i.e. to R, G, B histograms. Instead, the RGB color model has been described as an example color model. Alternatively, other color models may be used as well, such as the conventional CMYK color model, the conventional CMY color model, the conventional HSB color model, the conventional HLS color model, the conventional YIQ/YUY color model and/or the conventional Lab color model.

In particular, the entropy of the relative gray value histograms can provide useful indices for comparison of different screenshots. In particular, parameters extracted by means of the Fourier or wavelet method allow conclusions as to recurring patents on the web sites. If, for example, a background pattern is not correctly represented in a web browser, some parameters will differ in value from those of a correctly represented site.

Here, conventional programs may be used for generating the screenshots.

The present invention is not limited to the above example descriptions of the various embodiments. In particular, a cluster of computers, calculators, workstations, etc., may for example be used for creating the screenshots. Furthermore, the creation of screenshots can be accelerated by reading out for example results with so-called "rendering engines" of the browsers in the memory directly.

Figure 2:
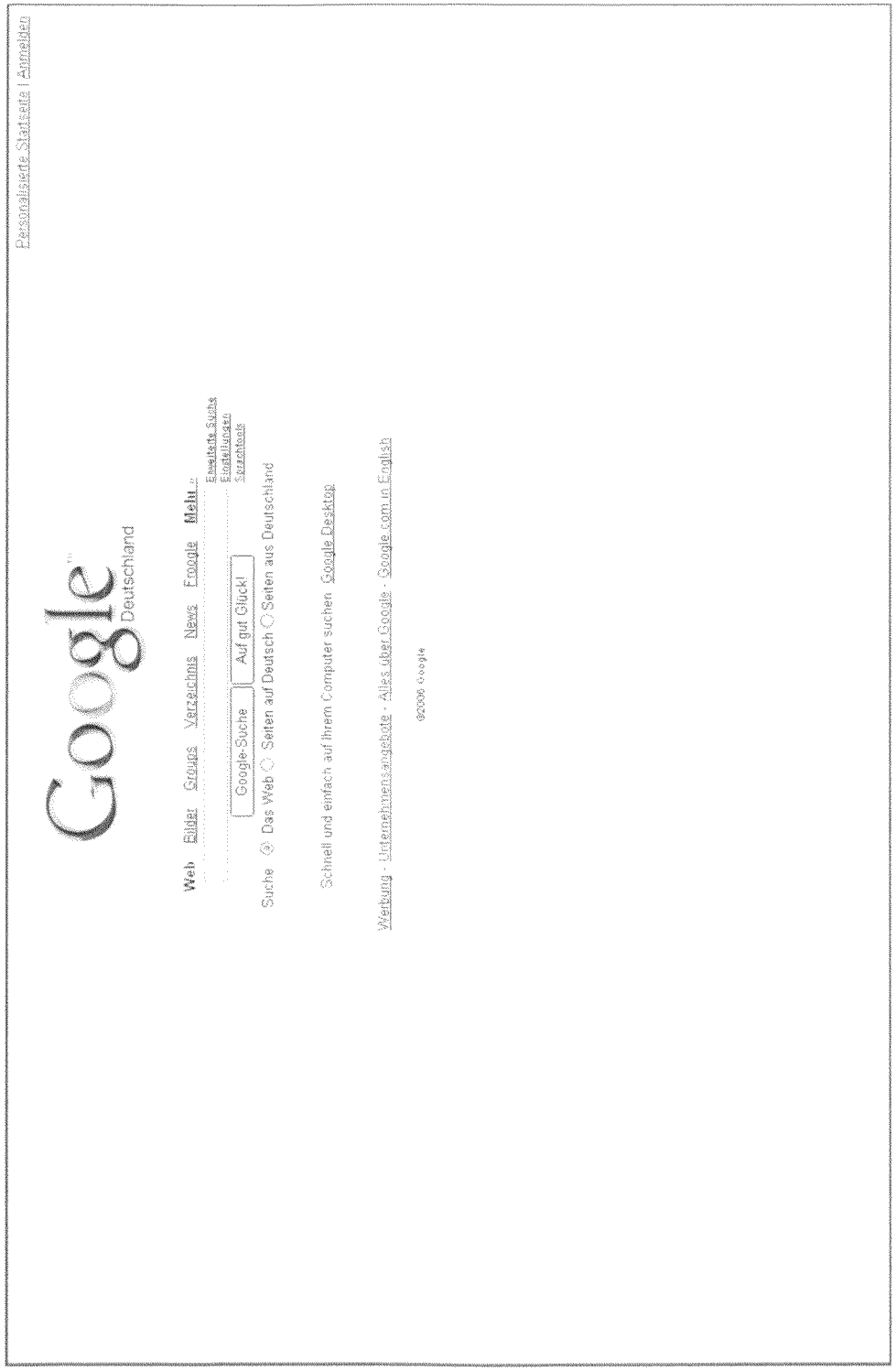
FIG. 2: A representation of a web site according to some embodiments.
Figure 3:
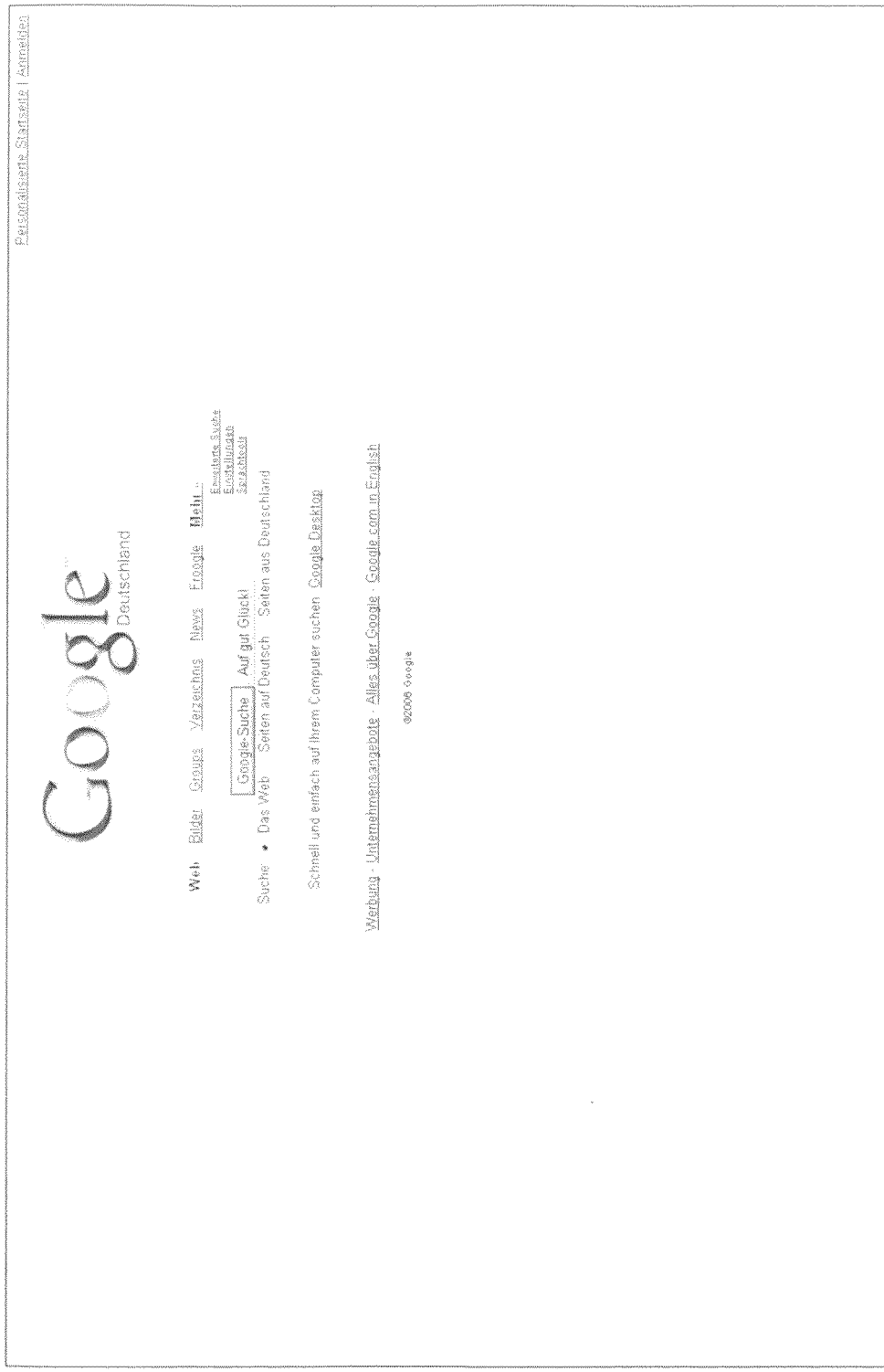
FIG. 3: A representation of a web site according to some embodiments.

FIGS. 2 and 3 each show a representation of a web site by means of different web browsers, each created under the operating system Windows XP. FIG. 2 shows a representation of the web site having the URL: "HTTP://www.google.de" by means the web browser "Internet-Explorer 6". FIG. 3 shows the same web site by means of the web browser "Opera 8.5". No differences can be taken from these two screenshots. The indication of the URL is an example indication of the address of the web-based user interface to be represented and compared.

Figure 4:
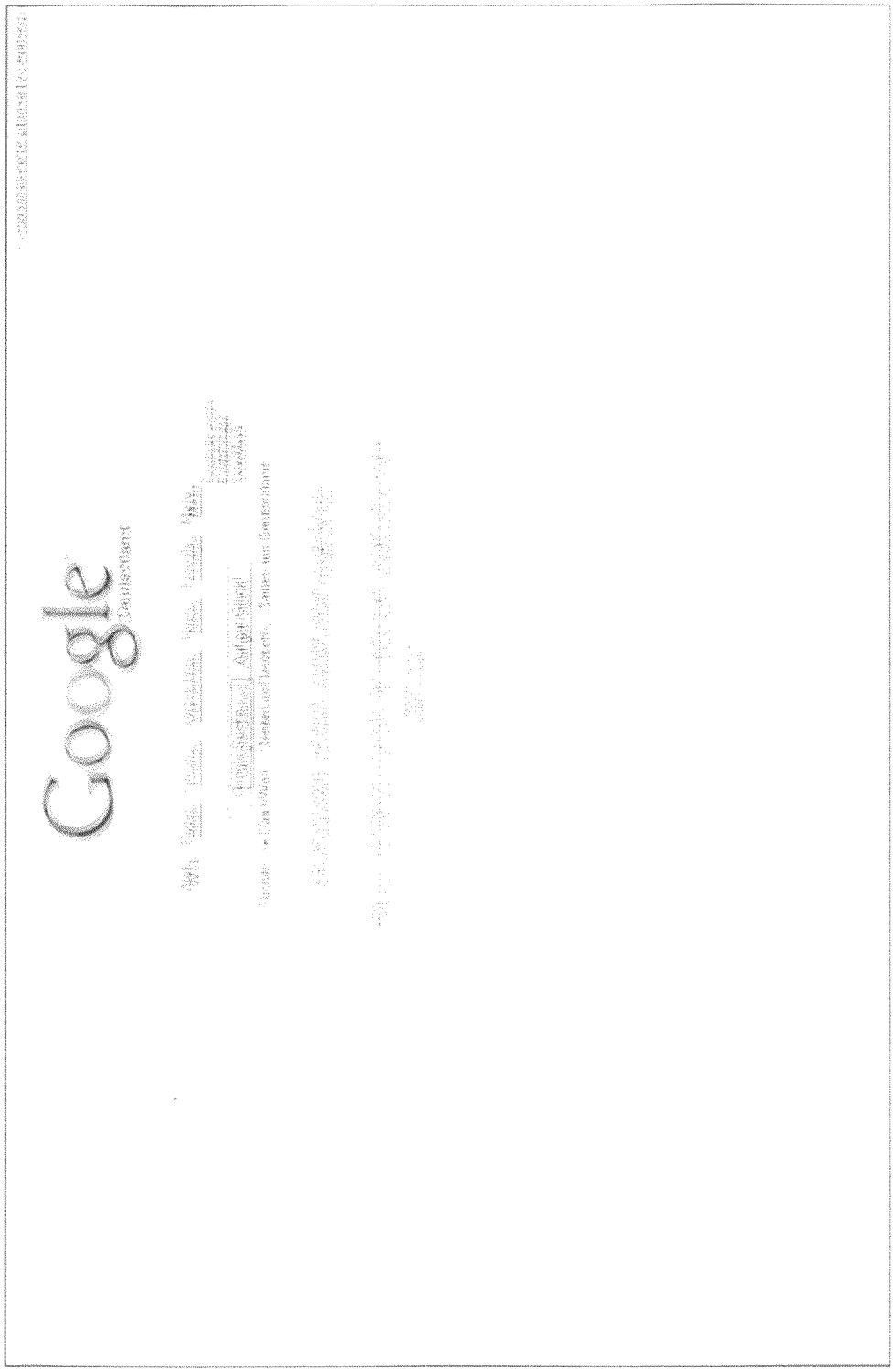
FIG. 4: A representation of a conventional superposition of the representations according to FIGS. 2 and 3.

FIG. 4 shows a superposition of the two representations of FIGS. 2 and 3, wherein the representation of FIG. 2 has been superimposed with the representation of FIG. 3 with a transparency of 50%.

Figure 5:
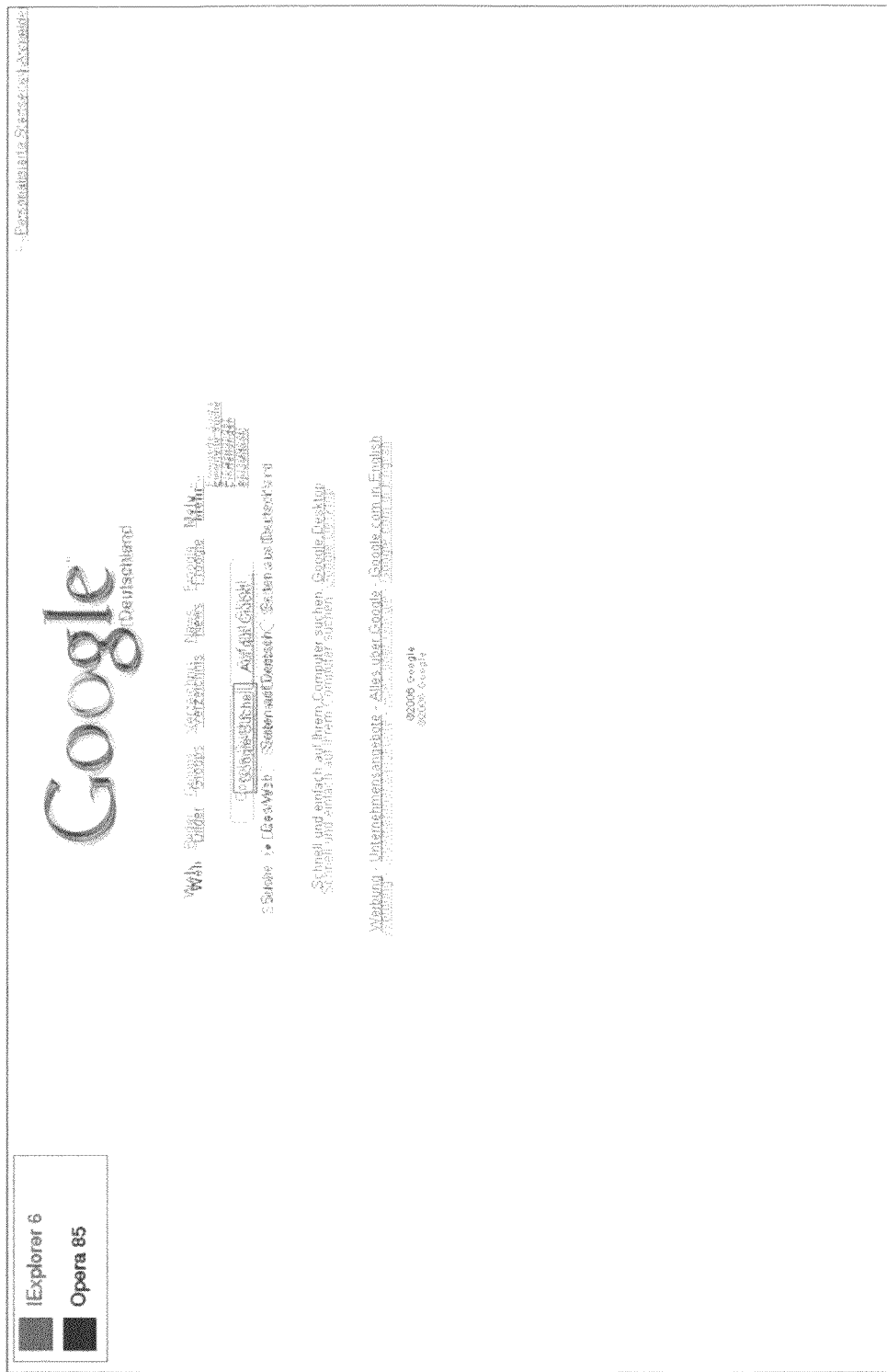
FIG. 5: A representation of a superposition of the representations according to FIGS. 2 and 3 according to some embodiments of the present invention.

FIG. 5 shows an analogue representation, wherein, according to a some embodiments of the invention, the screenshots according to FIG. 2 and FIG. 3 have been colored (in different gray shades as illustrated) before superposition. In particular, with respect to the representation according to FIG. 4, according to the some embodiments of the invention, differences in the representations in the two FIGS. 2 and 3 become more clearly visible, specifically, matches are shown very dark by combination of the colors red and blue, whereas differences become clearly visible in red or blue. In contrast, in the representation according to FIG. 4, differences cannot that easily be seen, since they have the same color, in particular blue, for example in both images.

For creating the representation according to FIG. 5, the screenshots according to FIGS. 2 and 3 have been colored before superposition. However, advantageously, differences and common features of the individual representations may also be recognized better, than with a conventional superposition, if the created output pixel image is output as a gray level image instead of colored. Consequently, it is not necessary to output the output pixel image in a colored manner as long as the processing of the at least two pixel images to the output pixel image is done in colored manner and the output pixel image is a color image. The actual representation of the output pixel image as a user, such a web designer, sees it, may be a gray level image again, like it is for example obtained by printing the output pixel image on a single-color printer.

Figure 6:
FIG. 6: An example representation of a web site.
Figure 7:
FIG. 7: An example representation of a web site.

Analogously, FIG. 6 shows a representation of the URL: "HTTP://www.Uni-Karlsruhe.de/besucher/" with the web browsers "MS Internet Explorer 6" under the operating system Windows XP. FIG. 7 shows the same site represented with the web browser "Opera 8.5", also under the operating system Windows XP.

Figure 8:
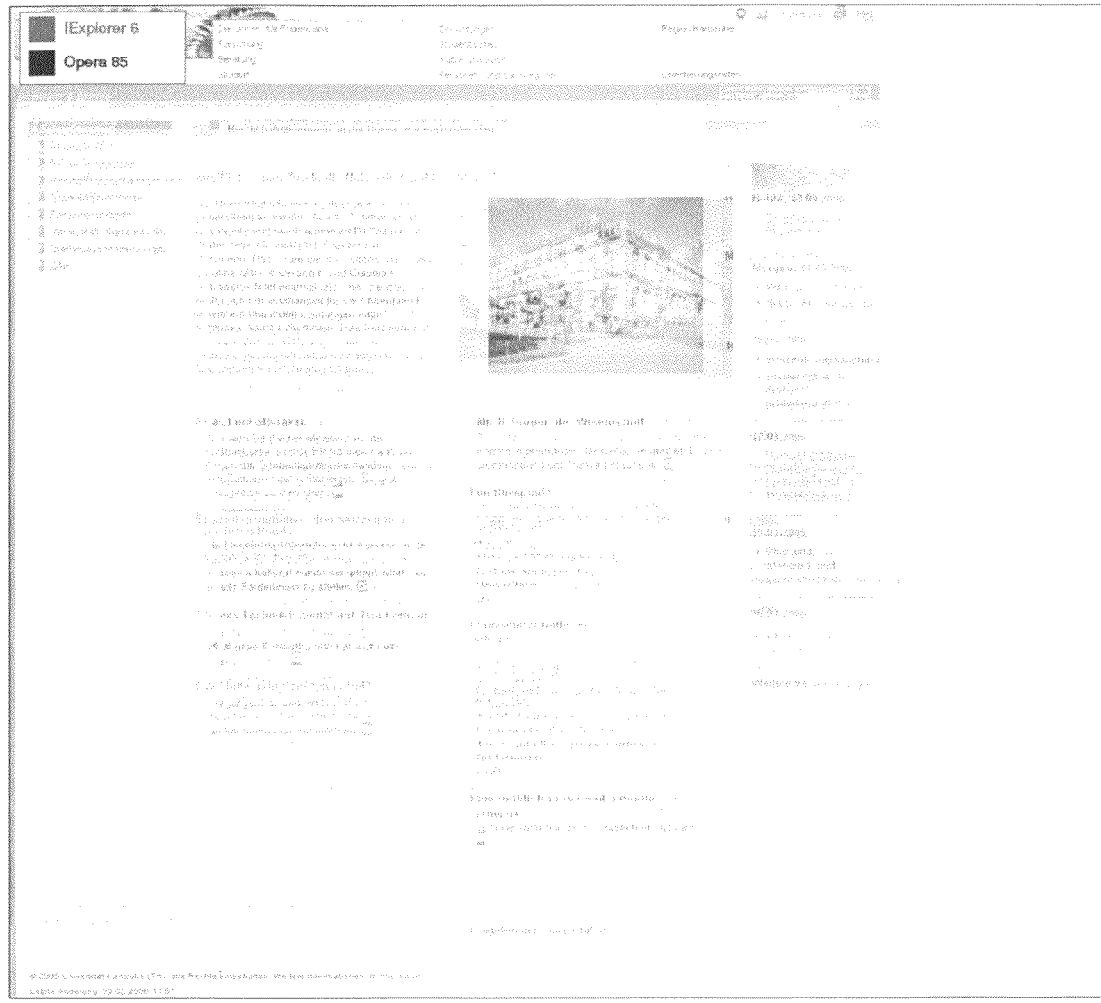
FIG. 8: An example representation of a superposition of the representations according to FIGS. 6 and 7 according to some embodiments of the present invention.

FIG. 8 shows a representation according to a variant embodiment of the present invention, wherein the respective (colored) screenshots have been colored red and blue, respectively, before superposition of the representations according to FIGS. 6 and 7. In the figures, the coloring is illustrated in respective gray shades. Analogously to FIG. 5, the differences and common features can be seen very clearly in FIG. 8. Likewise, as in FIG. 5, it is shown in FIG. 8 that the red representation has been created by means of the "Internet-Explorer 6" and the blue representation by means of "Opera 8.5".

Figure 9:
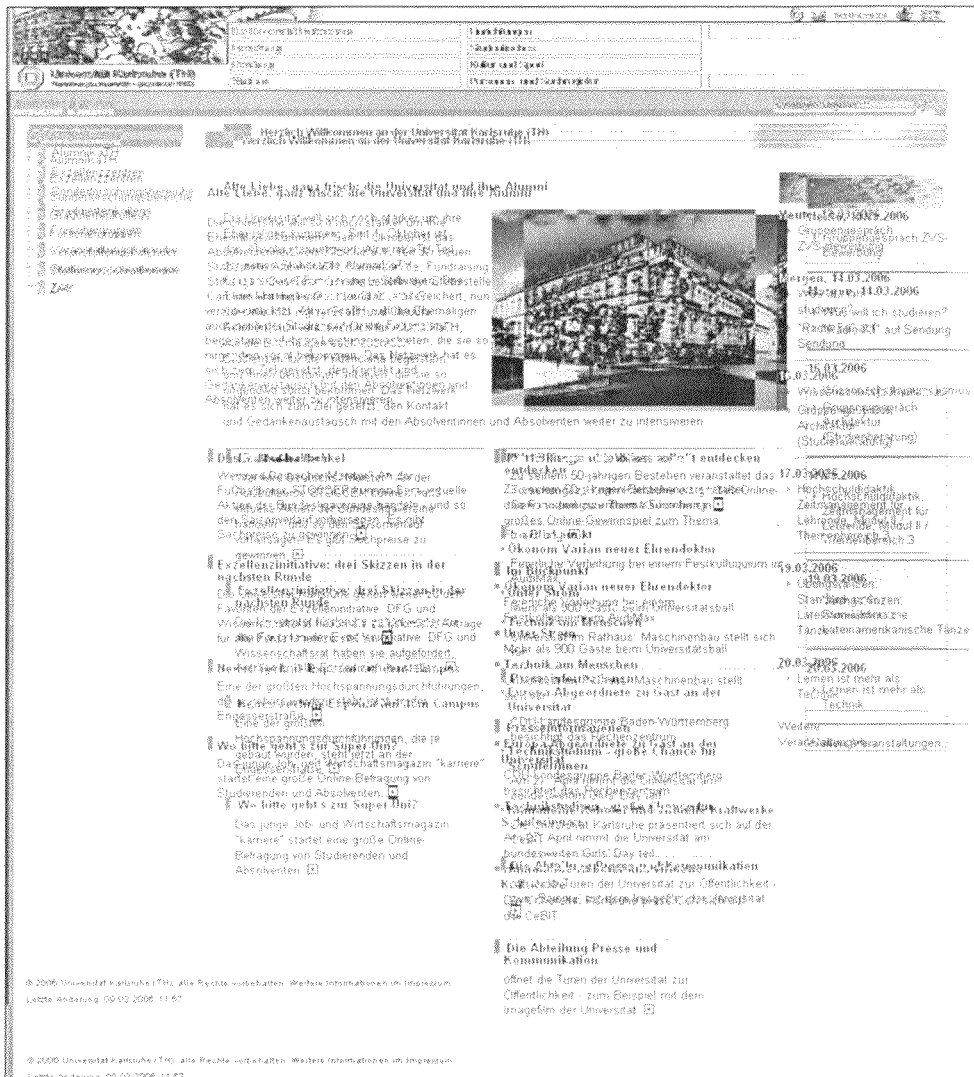
FIG. 9: An example representation of a superposition of the representations according to FIGS. 6 and 7 by difference.
Figure 10:
FIG. 10: An example representation of a superposition of the representations according to FIGS. 6 and 7.

FIG. 9 shows a conventional superposition of the representations according to FIGS. 6 and 7 by difference. FIG. 10 shows a conventional superposition of the representation according to FIGS. 6 and 7, wherein the representation according to FIG. 7 has a transparency of 50% with respect to the representation according to FIG. 6. Analogously to FIG. 4, it can be seen in FIG. 10 that common features and differences cannot be illustrated that easily as according to a variant embodiment of the invention, which is shown in FIG. 8. Likewise, it can be taken from FIG. 10 that differences and common features cannot be illustrated that easily as according to the variant embodiment of the present invention, which is shown in FIG. 8.

Figure 11:
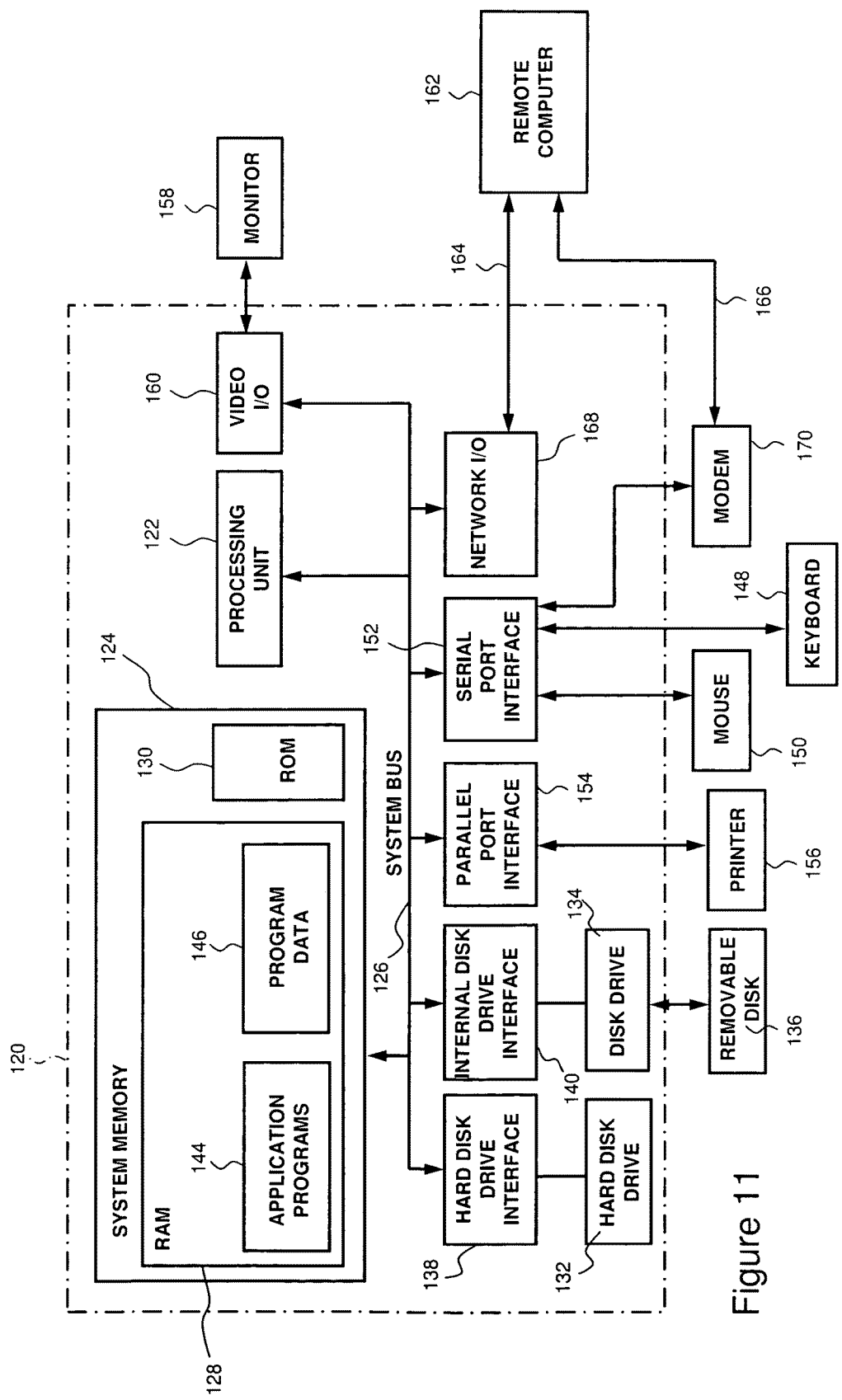
FIG. 11: A schematic view of a part of some embodiments of the invention.

With reference to FIG. 11, an example part of an embodiment of the invention is described, in particular how an evaluation server 10 may be embodied. A part of the embodiment of the invention comprises a universal computer device in the form of a conventional computer environment 120, e.g. a "personal computer" (PC) 120, comprising a processor unit 122, a system memory 124 and a system bus 126 connecting a plurality of system components, among others the system memory 124 and the processor unit 122. The processor unit 122 is capable of performing arithmetic, logical and/or control operations by accessing the system memory 124. The system memory 124 is capable of storing information and/or instructions for use in combination with the processor unit 122. The system memory 124 may include volatile and nonvolatile memories, for example "random access memory" (RAM) 128 and "read-only memory" (ROM) 130. The basic input output system (BIOS) containing the basic routines, which help transferring information between the elements within the PCs 120 for example during start up, may be stored in the ROM 130. The system bus 126 may be one of many bus structures, among others a memory bus or a memory controller, a peripheral bus and a local bus, which uses a specific bus architecture from a plurality of bus architectures.

The PC 120 may further comprise a hard disk drive 132 for reading and writing of a hard disk (not shown) and an external disk drive 134 for reading or writing of a removable disk 136 or a removable data carrier. The removable disk may be a magnetic disk or a magnetic diskette for a magnetic disk drive or diskette drive, or an optical diskette, such as a CD-ROM for an optical disk drive. The hard disk drive 132 and the external drive 134 are connected to the system bus 126 via a hard disk drive interface 138 and an external disk drive interface 140, respectively. The drives and the associated computer-readable media provide a non-volatile memory of computer-readable instructions, data structures, program modules, and other data to the PC 120. The data structures may comprise the relevant data for implementing a method as described above. Even though the exemplarily described environment uses a hard disk (not shown) and an external disk 142, other types of computer-readable media capable of storing computer-magnetic cassettes, flash memory cards, digital video diskettes, random access memory, read-only memories, etc.

A multitude of program-modules, in particular an operating system (not shown), one or more application programs 144, or program-modules (not shown) and program-data 146, may be stored on the hard disk, the external disk 142, the ROM 130 or the RAM 128. The application programs may comprise at least a part of the functionality as shown in FIG. 11.

A user may input commands and information into the PC 120 by means of input devices, such as a keyboard 148 and a computer mouse or trackball 150, as described above. Other input devices (not shown) may comprise a microphone and/or other sensors, a joystick, a gamepad, a scanner or the like. These or other input devices may be connected with the processor unit 122 by means of a serial interface 152 coupled to the system bus 126, or may be connected by means of other interfaces, such as a parallel interface 154, a game port or a universal serial bus (USB). Furthermore, information may be printed by means of a printer 156. The printer 156 and other parallel input/output devices may be connected to the processor unit 122 by means of the parallel interface 154. A monitor 158 or other kinds of display device(s) is/are connected to the system bus 126 by means of an interface, such as a video input/output 160. In addition to the monitor, the computer environment 120 may comprise other peripheral output devices (not shown), such as loudspeakers or acoustic outputs.

The computer environment 120 may communicate with other electronic devices, such a computer, a telephone with cord, a cordless telephone, a personal digital assistant (PDA), a TV set, or the like. In order to communicate, the computer environment 120 may work in a networked environment, wherein connections to one or several electronic devices are used. FIG. 11 represents the computer environment networked with a "remote computer" 162. The remote computer 162 may be another computer environment, such a server, a router, a network PC, a peer device or other common network nodes, and may comprise many or all of the elements described above with respect to the computer environment 120. The logical connections as illustrated in FIG. 11 comprise a "local area network" (LAN) 164 and a "wide area network" (WAN) 166. Such network environments are common in offices, company-wide computer networks, Intranets and the Internet.

If a computer environment 120 is used in a LAN network environment, the computer environment 120 may be connected to the LAN 164 via a network input/output 168. If the computer environment 120 is used in a WAN network environment, the computer environment 120 may comprise a modem 170 or other means for establishing a communication via the WAN 166. The modem 170, which may be internal or external with respect to the computer environment 120, is connected to the system bus 126 by means of the serial interface 152. In the network environment, program modules illustrated relative to the computer environment 120 or portions thereof, may be stored in a remote storage device, which can be accessed by or is system-inherent on a remote computer 162. Furthermore, other data relevant for the method or system described above may be present in an accessible manner on the remote computer 162 or accessible by same.

| List of Reference Numerals | |
|---|---|
| 1. | data processing device |
| 10 | evaluation server |
| 12 | server |
| 14 | server |
| 16 | input/output interface |
| 18 | user |
| 20 | processing logic |
| 120 | computer environment |
| 122 | processor unit |
| 124 | system memory |
| 126 | system bus |
| 128 | random access memory (RAM) |
| 130 | read-only memory (ROM) |
| 132 | hard disk drive |
| 134 | disk drive |
| 136 | removable disk |
| 138 | hard disk drive interface |
| 140 | disk drive interface |
| 142 | external disk |
| 144 | application program |
| 146 | program data |
| 148 | keyboard |
| 150 | computer mouse/trackball |
| 152 | serial interface |
| 154 | parallel interface |
| 156 | printer |
| 158 | monitor |
| 160 | video input/output |
| 162 | remote computer |
| 164 | "local area network" (LAN) |
| 166 | "wide area network" (WAN) |
| 168 | network input/output |

The invention claimed is:

1. A method for analyzing or testing at least one user interface, the method comprising:
   transmitting an address of at least one user interface, in particular a web-based user interface, or a source code together with the associated graphical elements of at least one user interface, in particular a web-based user interface, to an evaluation apparatus;
   transmitting the address of the at least one user interface or the source code together with the associated graphical elements of the at least one user interface to at least two differently configured presentation apparatuses;
   generating at least one pixel image of the user interface on each presentation apparatus;
   transmitting each generated pixel image to the evaluation apparatus;
   automatically determining or representing at least one difference between the generated pixel images of the at least one user interface, wherein for detecting or representing the difference of the pixel images, at least one index is determined for the pixel image, and the at least one index of each pixel image is compared to the at least one index of the further pixel images;
   creating each pixel image as a gray level image with M*N pixels, wherein the value of the gray level is between 0 and 255 for each pixel;
   creating a gray value histogram H=($x_0$, $x_1$, . . . , $x_{255}$) for each pixel image, wherein the value of each entry $x_i$ of the gray value histogram indicates how many pixels with the gray value i are present in the respective pixel image;
   calculating a relative gray value histogram h=($y_0$, $y_1$, . . . , $y_{255}$)=H/(M*N) for each pixel image;
   calculating an entropy $$E = -\sum_{i=0}^{255} y_i * \log_2 y_i$$

for each pixel image; and
   outputting at least one output variable depending on the entropy of each pixel image.

2. The method according to claim 1, wherein the output variable comprises the entropy E of each pixel image.

3. The method according to claim 1, wherein the output variable is created by means of the entropy E of each pixel image.

4. A method for analyzing or testing at least one user interface, the method comprising:
   transmitting an address of at least one user interface, in particular a web-based user interface, or a source code together with the associated graphical elements of at least one user interface, in particular a web-based user interface, to an evaluation apparatus;
   transmitting the address of the at least one user interface or the source code together with the associated graphical elements of the at least one user interface to at least two differently configured presentation apparatuses;
   generating at least one pixel image of the user interface on each presentation apparatus;
   transmitting each generated pixel image to the evaluation apparatus;
   automatically determining or representing at least one difference between the generated pixel images of the at least one user interface;
   creating two pixel images as gray level images with M*N pixels, wherein the value of the gray level is between 0 and 255 for each pixel;
   creating a first gray value histogram H=($x_0$, $x_1$, . . . , $x_{255}$) for the first pixel image, wherein the value of each entry $x_i$ of the first gray value histogram H indicates how many pixels with the gray value i are present in the first pixel image;
   creating a second gray value histogram H'=($x'_0$, $x'_1$, . . . , $x'_{255}$) for the second pixel image, wherein the value of each entry $x'_i$ of the second gray value histogram H' indicates how many pixels with the gray value i are present in the second pixel image;
   calculating a difference variable D, wherein:

$$D = |H - H'|$$
$$= \sum_{i=0}^{255} (|H[i] - H'[i]|)^2;$$

and
   marking a difference if D is greater than a predetermined threshold value, in particular if D>0.

5. The method according to claim 1, comprising the initial step of:
   creating a first and a second pixel image, each having the size of M*N pixel;
   selecting a rectangular selection area of the size M/2*N/2 pixels of a first pixel image, wherein a geometric center of the selection area is identical with a geometric center of the first pixel image;
   selecting a rectangular selection area of the size M/2*N/2 pixel of a second pixel image, wherein a geometric center of the selection area is identical with a geometric center of the second pixel image;

calculating a color of each pixel of the selection area of the first pixel image;

calculating a color of each pixel of the selection area of the second pixel image;

calculating an initial correlation coefficient by means of the colors of all pixels of the selection area of the first pixel image and by means of the colors of all pixels of the selection area of the second pixel image, wherein the selection area is associated with a shifting direction with an index 0;

the repeatedly performed steps:

selecting a further rectangular selection area of the size M/2*N/2 pixel of the second pixel image, wherein the geometric center of the further rectangular selection area of the second pixel image is shifted along a predetermined shifting direction with respect to the geometric center of the second pixel image, and the shifting direction is associated with an index;

calculating a color of each pixel of the further selection area of the second pixel image;

calculating a further correlation coefficient by means of the colors of all pixels of the selection area of the first pixel image and by means of the colors of all pixels of the further selection area of the second pixel image, wherein for each repeatedly performed step, the position of the geometric center of the further rectangular selection area of the second pixel image is different from the respective positions of the geometric center of the previous selection areas of the second pixel image, and the final step:

outputting the index of the shifting direction of the further selection area with the largest correlation coefficient from the set of the initial correlation coefficient and all further correlation coefficients.

6. The method according to claim 5, wherein a corner of the M*N-pixel-large second pixel image is selected as a coordinate origin and starting from the selected corner of the second pixel image, the edge of the length of M pixels of the second pixel image is a first axis of a coordinate system and starting from the selected corner of the second pixel image, the further edge of the length of N pixels of the second pixel image is a second axis of the coordinate system, wherein the geometric center is distant from the coordinate origin by M/2 pixels along the first axis and distant from the coordinate origin by N/2 pixels along the second axis, and the shifting direction may be one out of eight directions, wherein the geometric center of the further selection area, starting from the geometric center of the pixel image, is shifted by 0 pixels along the direction of the first axis and by N/4 pixels along the direction of the second axis, and this direction is associated with the index 1;

is shifted by M/4 pixels along the direction of the first axis and by N/4 pixels along the direction of the second axis, and this direction is associated with the index 2;

is shifted by M/4 pixels along the direction of the first axis and by 0 pixels along the direction of the second axis, and this direction is associated with the index 3;

is shifted by M/4 pixels along the direction of the first axis and by N/4 pixels in the opposite direction of the second axis, and this direction is associated with the index 4;

is shifted by 0 pixels along the direction of the first axis and by N/4 pixels in the opposite direction of the second axis, and this direction is associated with the index 5;

is shifted by M/4 pixels in the opposite direction of the first axis and by N/4 pixels in the opposite direction of the second axis, and this direction is associated with the index 6;

is shifted by M/4 pixels in the opposite direction of the first axis and by 0 pixels along the direction of the second axis, and this direction is associated with the index 7;

is shifted by M/4 pixels in the opposite direction of the first axis and by N/4 pixels along the direction of the second axis, and this direction is associated with the index 8.

7. A method for analyzing or testing at least one user interface, the method comprising:

transmitting an address of at least one user interface, in particular a web-based user interface, or a source code together with the associated graphical elements of at least one user interface, in particular a web-based user interface, to an evaluation apparatus;

transmitting the address of the at least one user interface or the source code together with the associated graphical elements of the at least one user interface to at least two differently configured presentation apparatuses;

generating at least one pixel image of the user interface on each presentation apparatus;

transmitting each generated pixel image to the evaluation apparatus; and automatically determining or representing at least one difference between the generated pixel images of the at least one user interface, wherein each pixel image is colored according to a predetermined color by the presentation apparatus or the evaluation apparatus, wherein the predetermined color is different for all pixel images, and an output pixel image is output by the evaluation apparatus for automatically determining or representing the difference of the pixel images of the at least one web-based user interface, which output pixel image is created by applying a predetermined operation, in particular pixel-wise difference, to the individual pixel images.

8. A method for analyzing or testing at least one user interface, the method comprising:

transmitting an address of at least one user interface, in particular a web-based user interface, or a source code together with the associated graphical elements of at least one user interface, in particular a web-based user interface, to an evaluation apparatus;

transmitting the address of the at least one user interface or the source code together with the associated graphical elements of the at least one user interface to at least two differently configured presentation apparatuses;

generating at least one pixel image of the user interface on each presentation apparatus;

transmitting each generated pixel image to the evaluation apparatus; and automatically determining or representing at least one difference between the generated pixel images of the at least one user interface, wherein for automatically determining or representing the difference of the P pixel images of the at least one web-based user interface, an output pixel image is output by the evaluation apparatus, wherein the output pixel image is created from P individual pixel images such that for each pixel image, the color value of each pixel of this pixel image is varied according to a predetermined color value variation function, wherein the color value variation function is different for all pixel images, and wherein, according to their position, corresponding pixels of the pixel images are offset against each other by means of a given operation, in particular pixelwise difference, as the corresponding pixel of the output pixel image.

9. The method according to claim 7, wherein the predetermined operation comprises at least one of a vector difference, XOR of the R, G, B values, and a mean value formation.

10. The method according to claim 1, wherein during transmission of the address of the at least one web-based user interface or during transmission of the source code of the at least one web-based user interface to the evaluation apparatus, at least one operating system or at least one web browser is specified or indicated, for which the pixel images of the at least one web-based user interface are created.

11. The method according to claim 10, wherein the address of the at least one web-based user interface or the source code are transmitted to the respective presentation apparatus together with the associated graphical elements of the at least one web-based user interface, said presentation apparatus having the corresponding operating system or the corresponding web browser.

12. The method according to claim 1, wherein during transmission of the address of the at least one web-based user interface or during transmission of the source code together with the associated graphical elements of the at least one web-based user interface to the evaluation apparatus, resolutions are indicated with which the pixel images of the at least one web-based user interface are to be created, wherein the resolutions are transmitted to the respective presentation apparatus(es).

13. A non-transitory computer-readable storage medium comprising instructions that, when loaded into a computer and executed by at least one processor of the computer, cause the computer to perform operations comprising:

transmitting an address of at least one user interface, in particular a web-based user interface, or a source code together with the associated graphical elements of at least one user interface, in particular a web-based user interface, to an evaluation apparatus;

transmitting the address of the at least one user interface or the source code together with the associated graphical elements of the at least one user interface to at least two differently configured presentation apparatuses;

generating at least one pixel image of the user interface on each presentation apparatus;

transmitting each generated pixel image to the evaluation apparatus;

automatically determining or representing at least one difference between the generated pixel images of the at least one user interface, wherein for detecting or representing the difference of the pixel images, at least one index is determined for the pixel image, and the at least one index of each pixel image is compared to the at least one index of the further pixel images;

creating each pixel image as a gray level image with M*N pixels, wherein the value of the gray level is between 0 and 255 for each pixel;

creating a gray value histogram $H=(x_0, x_1, \ldots, x_{255})$ for each pixel image, wherein the value of each entry $x_i$ of the gray value histogram indicates how many pixels with the gray value i are present in the respective pixel image;

calculating a relative gray value histogram $h=(y_0, y_1, \ldots, y_{255})=H (M*N)$ for each pixel image;

calculating an entropy $$E = -\sum_{i=0}^{255} y_i * \log_2 y_i$$

for each pixel image; and outputting at least one output variable depending on the entropy of each pixel image.

14. The method according to claim 4, wherein the output variable comprises the entropy E of each pixel image.

15. The method according to claim 4, wherein the output variable is created by means of the entropy E of each pixel image.

16. The method according to claim 4, comprising the initial step of:

creating a first and a second pixel image, each having the size of M*N pixel;

selecting a rectangular selection area of the size M/2*N/2 pixels of a first pixel image, wherein a geometric center of the selection area is identical with a geometric center of the first pixel image;

selecting a rectangular selection area of the size M/2*N/2 pixel of a second pixel image, wherein a geometric center of the selection area is identical with a geometric center of the second pixel image;

calculating a color of each pixel of the selection area of the first pixel image;

calculating a color of each pixel of the selection area of the second pixel image;

calculating an initial correlation coefficient by means of the colors of all pixels of the selection area of the first pixel image and by means of the colors of all pixels of the selection area of the second pixel image, wherein the selection area is associated with a shifting direction with an index 0;

the repeatedly performed steps:

selecting a further rectangular selection area of the size M/2*N/2 pixel of the second pixel image, wherein the geometric center of the further rectangular selection area of the second pixel image is shifted along a predetermined shifting direction with respect to the geometric center of the second pixel image, and the shifting direction is associated with an index;

calculating a color of each pixel of the further selection area of the second pixel image;

calculating a further correlation coefficient by means of the colors of all pixels of the selection area of the first pixel image and by means of the colors of all pixels of the further selection area of the second pixel image, wherein for each repeatedly performed step, the position of the geometric center of the further rectangular selection area of the second pixel image is different from the respective positions of the geometric center of the previous selection areas of the second pixel image, and the final step:

outputting the index of the shifting direction of the further selection area with the largest correlation coefficient from the set of the initial correlation coefficient and all further correlation coefficients.

17. The method according to claim 16, wherein a corner of the M*N-pixel-large second pixel image is selected as a coordinate origin and starting from the selected corner of the second pixel image, the edge of the length of M pixels of the second pixel image is a first axis of a coordinate system and starting from the selected corner of the second pixel image, the further edge of the length of N pixels of the second pixel image is a second axis of the coordinate system, wherein the geometric center is distant from the coordinate origin by M/2 pixels along the first axis and distant from the coordinate origin by N/2 pixels along the second axis, and the shifting direction may be one out of eight directions, wherein the geometric center of the further selection area, starting from the geometric center of the pixel image, is shifted by 0 pixels along the direction of the first axis and by N/4 pixels along the direction of the second axis, and this direction is associated with the index 1;

is shifted by M/4 pixels along the direction of the first axis and by N/4 pixels along the direction of the second axis, and this direction is associated with the index 2;

is shifted by M/4 pixels along the direction of the first axis and by 0 pixels along the direction of the second axis, and this direction is associated with the index 3;

is shifted by M/4 pixels along the direction of the first axis and by N/4 pixels in the opposite direction of the second axis, and this direction is associated with the index 4;

is shifted by 0 pixels along the direction of the first axis and by N/4 pixels in the opposite direction of the second axis, and this direction is associated with the index 5;

is shifted by M/4 pixels in the opposite direction of the first axis and by N/4 pixels in the opposite direction of the second axis, and this direction is associated with the index 6;

is shifted by M/4 pixels in the opposite direction of the first axis and by 0 pixels along the direction of the second axis, and this direction is associated with the index 7;

is shifted by M/4 pixels in the opposite direction of the first axis and by N/4 pixels along the direction of the second axis, and this direction is associated with the index 8.

18. The method according to claim 4, wherein during transmission of the address of the at least one web-based user interface or during transmission of the source code of the at least one web-based user interface to the evaluation apparatus, at least one operating system or at least one web browser is specified or indicated, for which the pixel images of the at least one web-based user interface are created.

19. The method according to claim 18, wherein the address of the at least one web-based user interface or the source code are transmitted to the respective presentation apparatus together with the associated graphical elements of the at least one web-based user interface, said presentation apparatus having the corresponding operating system or the corresponding web browser.

20. The method according to claim 4, wherein during transmission of the address of the at least one web-based user interface or during transmission of the source code together with the associated graphical elements of the at least one web-based user interface to the evaluation apparatus, resolutions are indicated with which the pixel images of the at least one web-based user interface are to be created, wherein the resolutions are transmitted to the respective presentation apparatus(es).

21. The method according to claim 7, wherein during transmission of the address of the at least one web-based user interface or during transmission of the source code of the at least one web-based user interface to the evaluation apparatus, at least one operating system or at least one web browser is specified or indicated, for which the pixel images of the at least one web-based user interface are created.

22. The method according to claim 21, wherein the address of the at least one web-based user interface or the source code are transmitted to the respective presentation apparatus together with the associated graphical elements of the at least one web-based user interface, said presentation apparatus having the corresponding operating system or the corresponding web browser.

23. The method according to claim 7, wherein during transmission of the address of the at least one web-based user interface or during transmission of the source code together with the associated graphical elements of the at least one web-based user interface to the evaluation apparatus, resolutions are indicated with which the pixel images of the at least one web-based user interface are to be created, wherein the resolutions are transmitted to the respective presentation apparatus(es).

24. The method according to claim 8, wherein during transmission of the address of the at least one web-based user interface or during transmission of the source code of the at least one web-based user interface to the evaluation apparatus, at least one operating system or at least one web browser is specified or indicated, for which the pixel images of the at least one web-based user interface are created.

25. The method according to claim 24, wherein the address of the at least one web-based user interface or the source code are transmitted to the respective presentation apparatus together with the associated graphical elements of the at least one web-based user interface, said presentation apparatus having the corresponding operating system or the corresponding web browser.

26. The method according to claim 8, wherein during transmission of the address of the at least one web-based user interface or during transmission of the source code together with the associated graphical elements of the at least one web-based user interface to the evaluation apparatus, resolutions are indicated with which the pixel images of the at least one web-based user interface are to be created, wherein the resolutions are transmitted to the respective presentation apparatus(es).

27. A non-transitory computer-readable storage medium comprising instructions that, when loaded into a computer and executed by at least one processor of the computer, cause the computer to perform operations comprising:

transmitting an address of at least one user interface, in particular a web-based user interface, or a source code together with the associated graphical elements of at least one user interface, in particular a web-based user interface, to an evaluation apparatus;

transmitting the address of the at least one user interface or the source code together with the associated graphical elements of the at least one user interface to at least two differently configured presentation apparatuses;

generating at least one pixel image of the user interface on each presentation apparatus;

transmitting each generated pixel image to the evaluation apparatus;

automatically determining or representing at least one difference between the generated pixel images of the at least one user interface;

creating two pixel images as gray level images with M*N pixels, wherein the value of the gray level is between 0 and 255 for each pixel;

creating a first gray value histogram $H=(x_0, x_1, \ldots, x_{255})$ for the first pixel image, wherein the value of each entry $x_i$ of the first gray value histogram H indicates how many pixels with the gray value i are present in the first pixel image;

creating a second gray value histogram $H'=(x'_0, x'_1, \ldots, x'_{255})$ for the second pixel image, wherein the value of each entry $x'_i$ of the second gray value histogram H' indicates how many pixels with the gray value i are present in the second pixel image;

calculating a difference variable D, wherein:

$$D = |H - H'|$$
$$= \sum_{i=0}^{255} |H[i] - H'[i]|;$$

and marking a difference if D is greater than a predetermined threshold value, in particular if D>0.

28. A non-transitory computer-readable storage medium comprising instructions that, when loaded into a computer and executed by at least one processor of the computer, cause the computer to perform operations comprising:

transmitting an address of at least one user interface, in particular a web-based user interface, or a source code together with the associated graphical elements of at least one user interface, in particular a web-based user interface, to an evaluation apparatus;

transmitting the address of the at least one user interface or the source code together with the associated graphical elements of the at least one user interface to at least two differently configured presentation apparatuses;

generating at least one pixel image of the user interface on each presentation apparatus;

transmitting each generated pixel image to the evaluation apparatus; and automatically determining or representing at least one difference between the generated pixel images of the at least one user interface, wherein each pixel image is colored according to a predetermined color by the presentation apparatus or the evaluation apparatus, wherein the predetermined color is different for all pixel images, and an output pixel image is output by the evaluation apparatus for automatically determining or representing the difference of the pixel images of the at least one web-based user interface, which output pixel image is created by applying a predetermined operation, in particular pixelwise difference, to the individual pixel images.

29. A non-transitory computer-readable storage medium comprising instructions that, when loaded into a computer and executed by at least one processor of the computer, cause the computer to perform operations comprising:

transmitting an address of at least one user interface, in particular a web-based user interface, or a source code together with the associated graphical elements of at least one user interface, in particular a web-based user interface, to an evaluation apparatus;

transmitting the address of the at least one user interface or the source code together with the associated graphical elements of the at least one user interface to at least two differently configured presentation apparatuses;

generating at least one pixel image of the user interface on each presentation apparatus;

transmitting each generated pixel image to the evaluation apparatus; and automatically determining or representing at least one difference between the generated pixel images of the at least one user interface, wherein for automatically determining or representing the difference of the P pixel images of the at least one web-based user interface, an output pixel image is output by the evaluation apparatus, wherein the output pixel image is created from P individual pixel images such that for each pixel image, the color value of each pixel of this pixel image is varied according to a predetermined color value variation function, wherein the color value variation function is different for all pixel images, and wherein, according to their position, corresponding pixels of the pixel images are offset against each other by means of a given operation, in particular pixelwise difference, as the corresponding pixel of the output pixel image.

* * * * *